(12) United States Patent
Nguyen

(10) Patent No.: US 11,023,471 B1
(45) Date of Patent: *Jun. 1, 2021

(54) SCALABLE NATURAL LANGUAGE PROCESSING FOR LARGE AND DYNAMIC TEXT ENVIRONMENTS

(71) Applicant: Ontocord, LLC, Wilmington, DE (US)

(72) Inventor: Hiep Huu Nguyen, New York, NY (US)

(73) Assignee: Ontocord, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,071

(22) Filed: Sep. 30, 2019

Related U.S. Application Data

(63) Continuation of application No. 15/724,581, filed on Oct. 4, 2017, now Pat. No. 10,437,833.

(60) Provisional application No. 62/404,600, filed on Oct. 5, 2016, provisional application No. 62/404,615, filed on Oct. 5, 2016, provisional application No. 62/404,623, filed on Oct. 5, 2016.

(51) Int. Cl.
*G06F 16/00* (2019.01)
*G06F 16/2457* (2019.01)
*G06F 40/211* (2020.01)
*G06N 3/02* (2006.01)

(52) U.S. Cl.
CPC ...... *G06F 16/24575* (2019.01); *G06F 40/211* (2020.01); *G06N 3/02* (2013.01)

(58) Field of Classification Search
CPC .................................................. G06F 16/24575
See application file for complete search history.

(56) References Cited

PUBLICATIONS

Natural language processing, [online] Retrieved from https://en.wikipedia.org/wiki/Natural_language_processing, Oct. 3, 2016 [retrieved on Aug. 15, 2019].
Outline of natural language processing, [online] Retrieved from https://en.wikipedia.org/wiki/, Oct. 4, 2016 Outline_of_natural_language_processing [retrieved on Aug. 15, 2019].
Shallow Parsing, [online] Retrieved from https://en.wikipedia.org/wiki/Shallow_parsing, May 20, 2016 [retrieved on Aug. 15, 2019].
Semantic Role Labeling, [online] Retrieved from https://en.wikipedia.org/wiki/Semantic_role_labeling, Nov. 14, 2015 [retrieved on Aug. 15, 2019].

(Continued)

*Primary Examiner* — Ajith Jacob

(57) ABSTRACT

Briefly stated, the invention is directed to retrieving a semantically matched knowledge structure. A question and answer pair is received, wherein the answer is received from a query of a search engine. A question is constraint-matched with the answer based on maximizing a plurality of constraints, wherein at least one of the plurality of the constraints is a similarity score between question and answer, wherein the constraint matching generates a matched sequence. For one or more answer sequences, a subsequence is found that are not parsed as answer slots. Query results are obtained from another search engine based on a combination of the answer or question, and the non-answer subsequence. And a KB based is refined on the query results and the constraint matching and based on a neural network training, for a further subsequent semantic matching, wherein the KB includes a dense semantic vector indication of concepts.

20 Claims, 20 Drawing Sheets

(56) References Cited

PUBLICATIONS

Natural Language Understanding, [online] Retrieved from https://en.wikipedia.org/wiki/Natural_language_understanding, Oct. 5, 2016 [retrieved on Aug. 15, 2019].
Computational Semantics, [online] Retrieved from https://en.wikipedia.org/wiki/Computational_semantics, Nov. 10, 2014 [retrieved on Aug. 15, 2019].
Word Sense Disambiguation, [online] Retrieved from https://en.wikipedia.org/wiki/Word-sense_disambiguation Sep. 28, 2016 [retrieved on Aug. 15, 2019].
Synonym Ring, [online] Retrieved from https://en.wikipedia.org/wiki/Synonym_ring, Aug. 29, 2015 [retrieved on Aug. 15, 2019].
WordNet, [online] Retrieved from https://en.wikipedia.org/wiki/WordNet, Aug. 31, 2016 [retrieved on Aug. 15, 2019].
Brill Tagger, [online] Retrieved from https://en.wikipedia.org/wiki/Brill_tagger, Jun. 26, 2016 [retrieved on Aug. 15, 2019].
Lemmatisation, [online] Retrieved from https://en.wikipedia.org/wiki/Lemmatisation, Sep. 6, 2016 [retrieved on Aug. 15, 2019].
Grammar, [online] Retrieved from https://en.wikipedia.org/wiki/Grammar, Oct. 4, 2016 [retrieved on Aug. 15, 2019].
Semantic Relatedness (redirecting to Semantic Similarities), [online] Retrieved from http://en.wikipedia.org/wiki/Semantic_relatedness, Sep. 9, 2016 [retrieved on Aug. 15, 2019].
Lesk Algorithm, [online] Retrieved from https://en.wikipedia.org/wiki/Lesk_algorithm, Sep. 28, 2016 [retrieved on Aug. 15, 2019].
Cosine Similarity, [online] Retrieved from https://en.wikipedia.org/wiki/Cosine_similarity, Sep. 2, 2016 [retrieved on Aug. 15, 2019].
Vector Space Model, [online] Retrieved from https://en.wikipedia.org/wiki/Vector_space_model, Sep. 29, 2016 [retrieved on Aug. 15, 2019].
Feature Hashing, [online] Retrieved from https://en.wikipedia.org/wiki/Feature_hashing, Aug. 18, 2016 [retrieved on Aug. 15, 2019].
Cluster Analysis, [online] Retrieved from https://en.wikipedia.org/wiki/Cluster_analysis, Sep. 15, 2016 [retrieved on Aug. 15, 2019].
Risto Miikkulainen, Subsymbolic Natural Language Processing: An Integrated Model of Scripts, Lexicon, and Memory (Neural Network Modeling and Connectionism) MIT Press, May 20, 1993, ISBN 0-262-13290-7.
Word2Vec, [online] Retrieved from https://en.wikipedia.org/wiki/Word2vec, Oct. 3, 2016 [retrieved on Aug. 15, 2019].
Never-Ending Language Learning, [online] Retrieved from https://en.wikipedia.org/wiki/Never-Ending_Language_Learning, May 29, 2015 [retrieved on Aug. 15, 2019].
Read the Web, Research Project at Carnegie Mellon University, [online] Retrieved from https://web.archive.org/web/20161002145156/http://rtw.ml.cmu.edu/rtw/publications, Oct. 2, 2016 [retrieved on Aug. 15, 2019].

DRAWINGS

SCALABLE NATURAL LANGUAGE PROCESSING FOR LARGE AND DYNAMIC TEXT ENVIRONMENTS

CROSS-REFERENCE TO RELATED APPLICATION(S)

This application is a continuation of U.S. patent application Ser. No. 15/724,581, filed Oct. 4, 2017 ("the '581 Application"). The '581 Application claims the benefit of U.S. Provisional Application No. 62/404,600, filed Oct. 5, 2017, U.S. Provisional Application No. 62/404,615, filed Oct. 5, 2017, and U.S. Provisional Application No. 62/404,623, filed Oct. 5, 2017. The entirety of each of these afore-mentioned applications is incorporated herein by reference.

FIELD OF THE INVENTION

The invention relates generally to communicating content over a network, and more particularly but not exclusively to natural language processing ("NLP") in large and web scale text environments that exhibits dynamic behaviors such as changing syntactic structures and semantic meanings of text.

BACKGROUND OF THE INVENTION

Natural language processing, including computational semantics and knowledge representation, has become an important component of modern user interfaces. However, systems and methods developed for computational semantics and knowledge representation can be difficult and time consuming to build (often by hand), and may be fragile and not scale well to large corpora and web based scaled language processing. A drawback with current natural language processing systems, including symbolic and subsymbolic approaches is that they are generally resource heavy both in processing and memory. Even with modern computing, fast networks and cheap memory, these systems can take hours, or days to train, and the knowledge base and rules (whether in symbolic or subsymbolic form), may be in the order of gigabytes.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified. For a better understanding of the invention, reference will be made to the following Detailed Description of the Invention, which is to be read in association with the accompanying drawings, wherein.

DETAILED DESCRIPTION OF THE INVENTION

Figure 1:
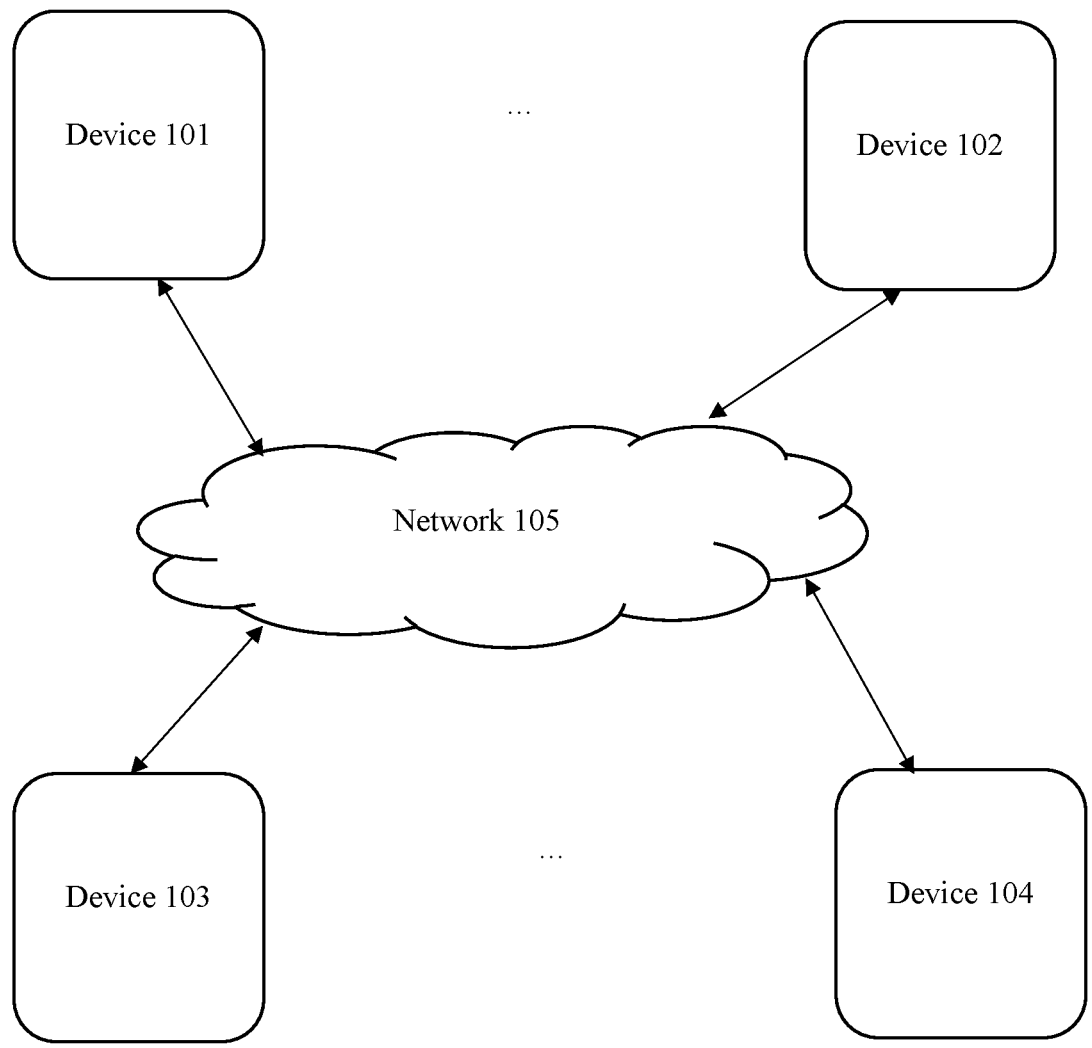
FIG. 1 is a diagram illustrating an environment for natural language processing.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" comprise plural references. The meaning of "in" comprises "in" and "on."

Briefly stated, the invention is directed towards a scalable natural language processing method, system, device and processor readable medium for large and dynamic text environments. The invention is directed to large coverage knowledge base learning and construction for natural language processing, as well as machine learned and constructed structures for parsing and understanding text. The invention is described in various embodiments, including a method, device, system and processor readable medium for semantic-syntactic parsing, performing discourse enhancements and other NLP user based interactions. The invention is directed to light-weight but broad coverage NLP processing and representations. The invention may comprise one or more combination of the aspects described herein.

In one embodiment, the invention is directed to a device, system and method for robust and scalable natural language processing and knowledge representation. The invention described herein comprises methods for learning of language processing tasks and representations using logic based, symbolic based and/or subsymbolic based (e.g., vector and neural based) methods in a large and dynamic text environment.

In one embodiment, the invention is directed to various natural language processing or information retrieval tasks, such as searching, named entity recognition, summarization, categorization (e.g., topic identification, sentiment analysis), text generation, translation, or the like. For example, a better lexicon or ontology that permits better matching may be used for mapping one language (e.g., English) to another language (e.g., Chinese). The described shallow semantic parsing permits better summarization by extracting the relevant portions of text and presenting the relevant section to the user in one or more presentations, including table form, paragraph form, in a popup, or the like. The described translation based learned rules can be used to create parsers of various forms, including parsing for named entity, such as finding the names of products or services within text, or the like. In one embodiment, an additional step(s) to the processes described below, including summarizing, searching, named entity recognition, summarization, categorization, or performing another natural language processing task based on information derived from the previous steps. In one embodiment, such addition step(s) may comprise summaries to one or more devices, flagging topic identification (such as flagging topics which may be of interest to law enforcement, which may suggest blocking (abusive, offensive, infringing, etc.), or the like), or blocking content, or the like.

As used herein, the term "text" or "word" as used herein comprises written language such as found in electronic form in email messages, documents, text messages, web pages, or the like, spoken form as processed from the signal to the speech-to-word level, visually recognized sign language, or any other form of natural language. The term "NLP" refers to one or more combinations of the natural language processing invention set forth herein alone or in combination with other natural language processing or information retrieval methods, systems, devices or processor readable medium, including constrained semantic-syntactic subsequence matching, transformation based learning learned rules, ontology constrained word sense disambiguation, and the like. As used herein, the term "symbol" means an atomic symbol or in another embodiment, a subsymbolic representation such as a vector based representation, a semantic vector based representation, or the like. Herein, a sense may be denoted with brackets ("[ . . . ]") based on the context to differentiate from actual strings (or signals) of text. In one embodiment, the symbol may be merely the string for a word, a hash of the string, an index, a vector or the like. In one embodiment, the symbol may exist in a graph of knowledge, lexicon, rule base, ontology or the like, from which relationships to other symbols may be derived. As used herein, the term "KB" or "ontology" means any data ordering of data that represents a concept (e.g., dog, cat, running-frame, eating-in-a-restaurant-on-Friday script, etc.), whether a data structure or a functionally derived (e.g., in real time) trough applications, semantic vector mappings, or the like. The KB/ontology may be one or more KB combined together either into one KB in a data structure, or virtually through functional means (e.g., through subsumtion, logic rules such as rule-chaining, choosing the sense between several KBs that have the highest information gain, etc.) as further described herein. As used herein, the term "learn" or "learning" means application of computational induction, deduction, and/or abduction as further set forth herein, whether using generalization and LCS computing, rule-chaining, or the like and/or the learning processes as further described herein.

Illustrative Operating Environment

FIG. 1 illustrates an environment in which the invention may operate. However, not all of these components may be required to practice the invention, and variations in the arrangement and type of the components may be made without departing from the spirit or scope of the invention. In one embodiment, the invention may operate on low memory devices, low powered devices, personal computing devices (e.g., mobile phones, IoT devices, speech enabled security cameras, etc.) and/or low network or no network connectivity environments. Such devices may be devices 101 to 102 for example. In one embodiment, some or all of the processes described herein may be performed on devices 101 to 102, in a distributed and/or multi-threaded fashion (with or without process locks). In one embodiment, some or all of the processes set forth herein may operate on server device such as device 103, wherein computationally intense operations are performed on the server 103. In yet other environments, some or all of the processes described herein may be performed on a hybrid or specialized device such as device 104 which has characteristics of a sever but which may be a personal device, or other hybrid devices such as a GPU processor designated for heavy computational processing (e.g., providing matrix operations which may be useful for vector based semantic models), a firewall device, a routing device, or the like. In one embodiment, the devices 101 to 104 may be interconnected via a network 105, or peer-to-peer connected (not shown), or connected in other configurations. In one embodiment, a device may have intermittent, low bandwidth or no connection to a network. In one embodiment, the processes described herein may be performed all or mostly within a web browser, application, web based operation system, or the like, on one or more devices 101-104. In one embodiment, a proxy routing device 104 may process natural language text being sent through it for various tasks as described herein, for example. In another embodiment, the NLP processing may be performed all or mostly within a browser of mobile phone 101 for example.

Network 105 is configured to couple one computing device with another computing device. Network 105 may be enabled to employ any form of computer readable media for communicating information from one electronic device to another. Also, network 105 can comprise the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically comprise twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may comprise any of a variety of wireless sub-networks that may further overlay stand-alone ad-hoc networks, and the like, to provide an infrastructure-oriented connection. Such sub-networks may comprise mesh networks, Wireless LAN (WLAN) networks, cellular networks, and the like. Network 105 may also comprise an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may comprise virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and comprises any information delivery media. The terms "modulated data signal," and "carrier-wave signal" comprises a signal that has one or more of its characteristics set or changed in such a manner as to encode information, instructions, data, and the like, in the signal. By way of example, communication media comprises wired media such as twisted pair, coaxial cable, fiber optics, wave guides, and other wired media and wireless media such as acoustic, RF, infrared, and other wireless media.

Illustrative NLP Device

Figure 2:
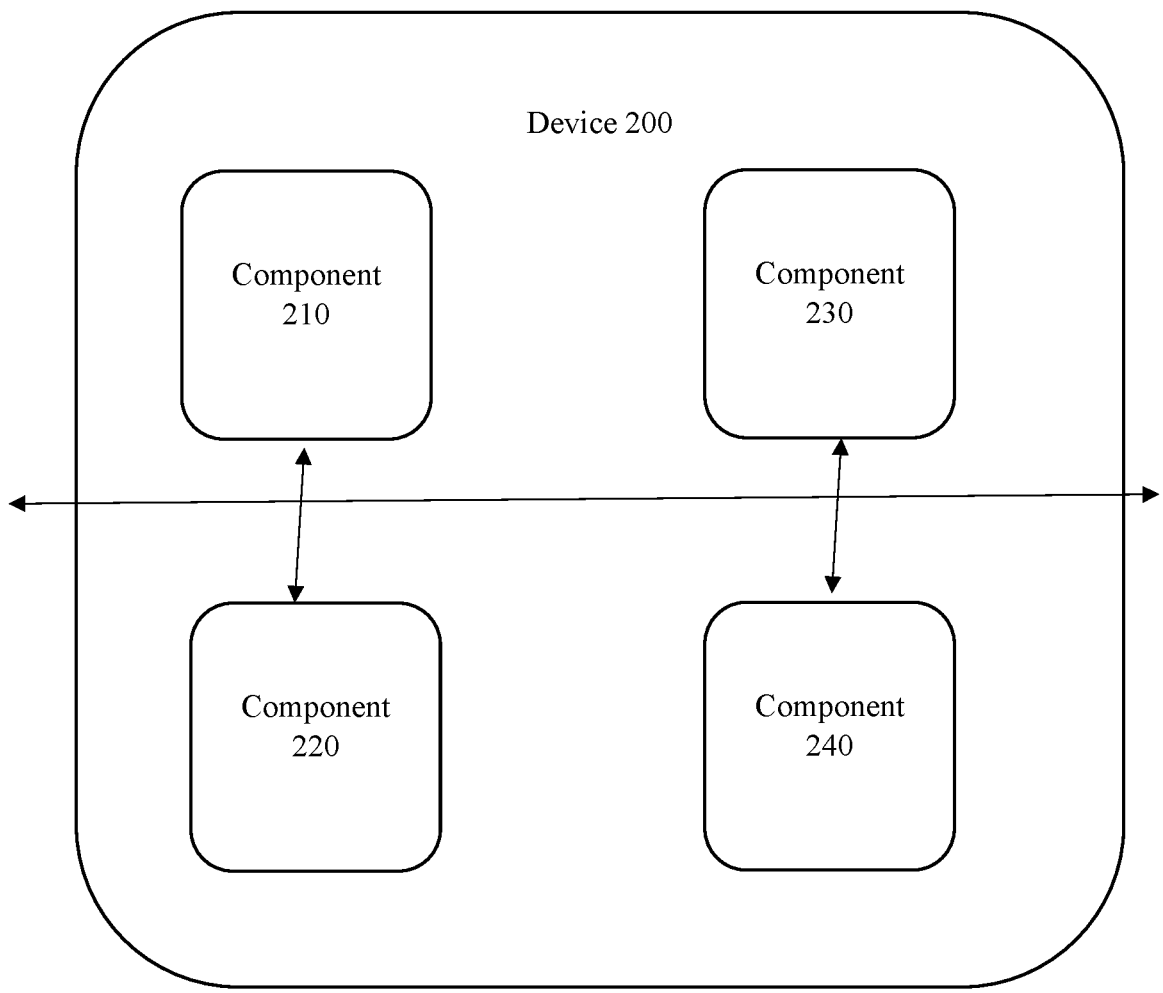
FIG. 2 is a diagram illustrating a device for natural language processing.

FIG. 2 shows an exemplary NLP device 200 for performing natural language processing. Device 200 may operate as any of the devices 101 to 104 of FIG. 1. It will be appreciated that not all components of device 200 are illustrated, and that network device 200 may comprise more or less components than those shown in FIG. 2. In one embodiment, the components are interconnected, via, for example, a bus, or other computer architecture. In one embodiment, the components may provide input and/or output (as shown by the arrows) whether as data, signals or otherwise. In one embodiment, component 210 may be a processor such as a CPU or other processing unit such as a GPU or specialized processing unit optimized for performing operations such as described herein. In one embodiment, component 230 may be an output device such as a screen, touch screen, display or otherwise, or any other type of output device, such as a speaker for providing spoken text. In one embodiment, component 220 may be an input component for receiving input, including touch, mouse events, keyboard, microphone, camera or any other type of input component. In one embodiment, component 240 may be a memory component for storing one or more parts of the KB, NLP parsing rules, or other NLP components as described herein and/or code for performing the steps described herein. In another embodiment, the NLP processing described herein may be performed all or mostly within a component 210 and/or performed in cooperation with data being sent and received over a network (physical, wireless, or otherwise). In one embodiment, the NLP processing may be performed in threads, multi-processes or otherwise (e.g., one process may be continuously refining a KB, while another process may parse text based on NLP processing, another process may learn parsing rules, and yet another process may summarize text based on NLP processing). In one embodiment, the KB and learned parse rules may maximize some measure that are co-related, such as a measure that maximizes parsing coverage, while minimizing the size of the KB. In one embodiment, a browser, such as a web browser may operate on component 210 and be displayed in component 230. In another embodiment, spoken text based on the NLP processes described herein may be outputted via component 230.

Illustrative User Interface

Figure 3:
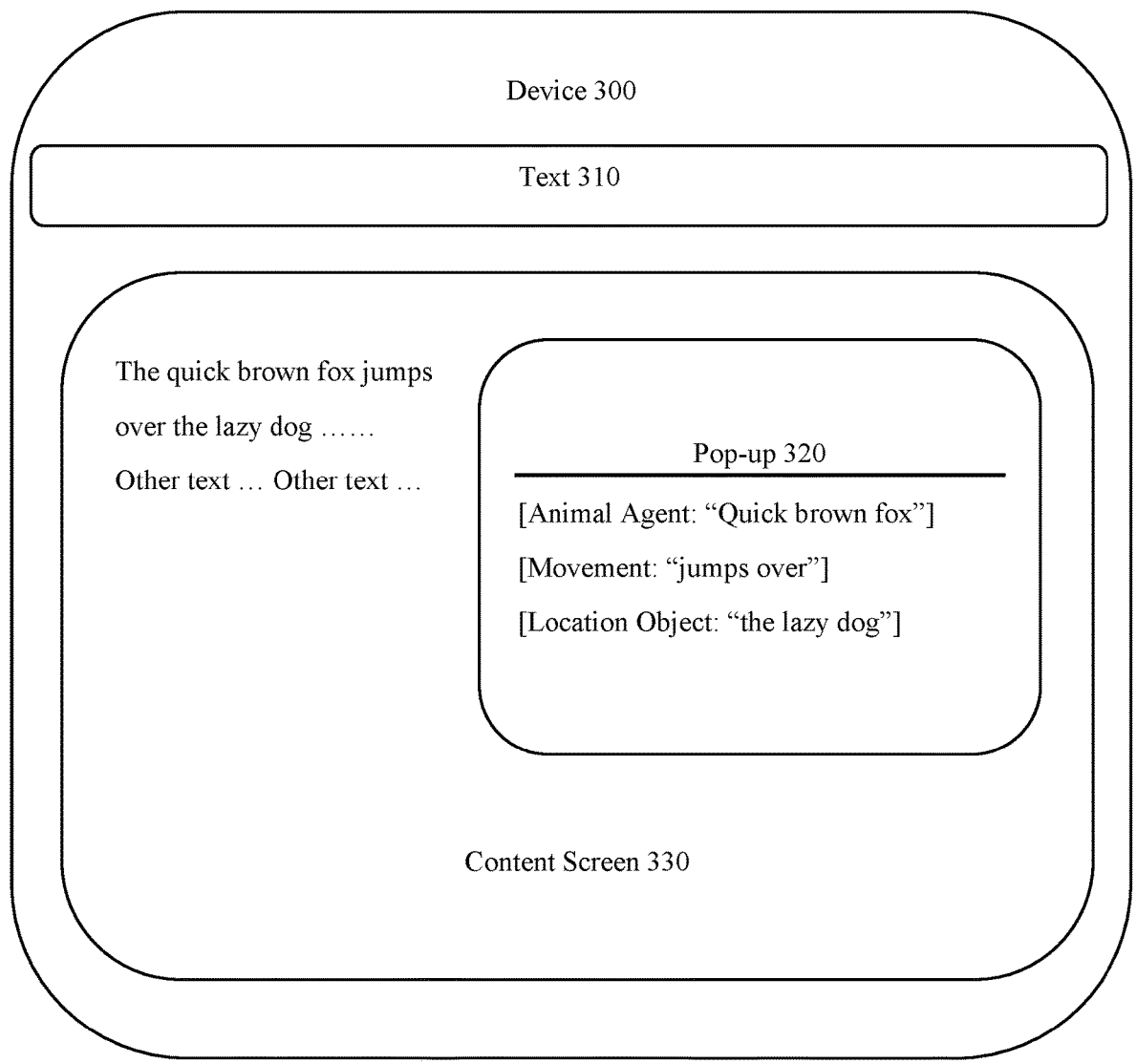
FIG. 3 is a diagram illustrating an user interface for natural language processing.

FIG. 3 shows an example user interface for providing access to the invention. In one embodiment, the user interface may be a browser, a text messaging app, or another input screen. In embodiment, device 300 may be device 200 or any of devices 101 to 104. In one embodiment, text 310 may be a URL input, or a search input, text messaging input, or the like, wherein the NLP processes may be applied to the text. In one embodiment, content screen 330 may be a browser web page, a text message or any other content, wherein the NLP processes may be applied to the content. In one embodiment, pop-up 320 may display the results of applying the NLP processing set forth herein, including shallow-semantic parsing of the text and/or content. In other embodiments (not shown), the results may be displayed inline within the text or content, as a side menu, as spoken words, or the like.

Generalized Operation

The operation of certain aspects of the invention will now be described with respect to FIGS. 4-19. It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. In one embodiment, the operations may be performed by an app resident on one or more devices. In one embodiment, the operations may be embodied by a program combined with data and sent over a network on an on-demand basis to be executed on a device. For example, the NLP operations may be performed by a JavaScript program within a web page, wherein the web page may contain text that is to be processed by the JavaScript program.

Figure 4:
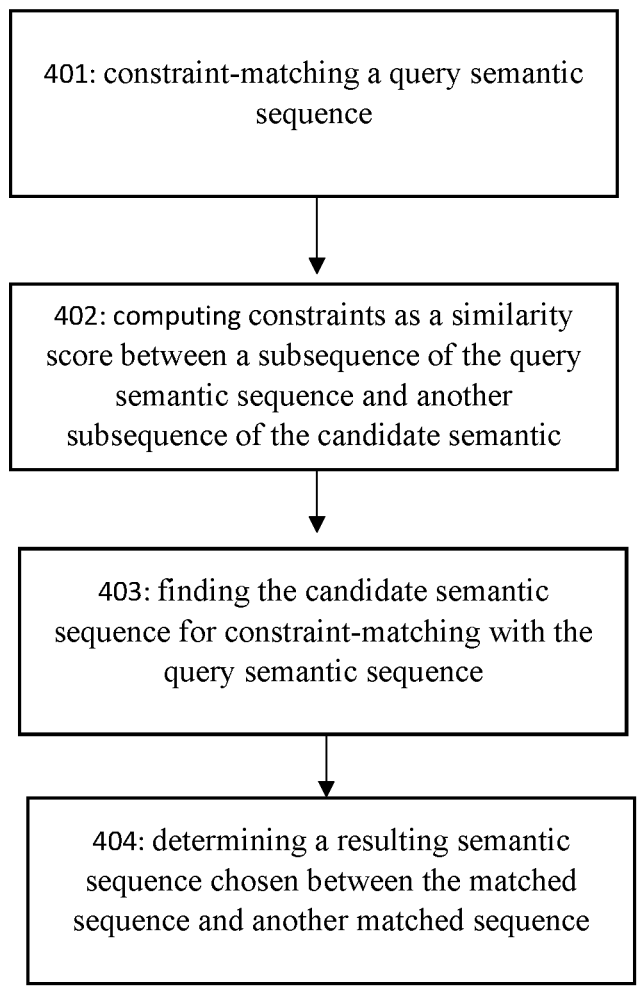
FIGS. 4-20 are diagrams for processes for NLP computing, in accordance with the invention.

FIG. 4. Sentence Constraing Matching Based on Semantic-Syntatic Relationships

In one embodiment, a method, system, device and processor readable media are directed to sense frame subsequence matching. For example, two or more sequences of the form A, B, C, D, where each item in the sequence is a symbol in an ontology and/or a word, match the two or more sequences based on length of matches, semantic and/or syntactic similarities, or the like.

For example, given the sentences:

[A dog] [ran] to [the yard]

[The man] [walked] [a dog]

Match the words as follows:

[animate-entity] [self-move].

The sequence matching may preserve ordering (as shown above), or may be unordered, for example, matching the following:

[A dog] [ran] to [the yard]

[The man] and [the dog] [walked]

Matches the following:

[animate-entity] [self-move].

The matches for "man" and "dog" and "ran" and "walked" are the closest match based on semantic similarities and syntactic similarities. Both "man" and "dog" are sub classes of "animate entity" senses and are singular nouns, and both "run" and "walk" are sub classes of "self-move" and are past tense verbs. The sequences of three words "A dog ran" and "The man walked" also increase the scoring for the match. "Yard" and "dog" are both sub classes of "physical-entity" which is very high up an ontology tree (higher meaning closer to root nodes) and may not provide significant information, so the matching pattern may or may not comprise "physical-entity" as a match depending on a threshold mechanism. Finding the common parent node is referred to as finding the least common subsumer ("LCS"). LCS may be performed on any ontology as described herein, including a virtual or subsumed ontology.

In any case, note that "a dog" at the end of the second sentence does not match "a dog" at the beginning of the first sentence because the sequence length of three words is stronger than the two word match, among other scoring measures. A simple string match would only return the match "dog" or ignoring cases "a dog", which would not be as informative.

Unlike a simple string match, the score is not the length of the matched subsequence, but rather the strength of the match. For example, a matching of two exact sequences of "is of the" may not be as strong a match as the sequence "Fighter group" and "Battle Fleet". In this example, while the length of the second group is two, versus three, the semantic match would be higher since there would be more information arising from the match (both are proper nouns, both are within the same synset family (Fighter~Battle, and group~fleet), etc.).

In one embodiment, a method, device, system and processor readable medium for retrieving a semantically matched knowledge structure, comprises: (401) constraint-matching a query semantic sequence with a candidate semantic sequence based on maximizing a plurality of constraints, wherein (402) at least one of the plurality of the constraints is a similarity score between a subsequence of the query semantic sequence and another subsequence of the candidate semantic sequence, wherein the constraint matching generates a matched sequence. In one embodiment, an associated matching score may also be generated. In one embodiment, the matching preserves the ordering of the matched sequences (e.g., after finding a longest, most salient subsequence matching, recursively perform on the left side and right side matches in the target on the left and right side respectively). In one embodiment, the matching does not preserve the ordering (referred to as an unordered subsequence match) of the matched sequences (e.g., after finding a longest, most salient subsequence matching, recursively perform on the left side and right side matches in the target on BOTH the left and right side).

In one embodiment, the query semantic sequence and the candidate semantic sequence comprises a plurality of semantics, wherein at least one of the plurality of semantics comprises at least one of a grammatical type of a word, at least one ontological class of the word, a morphological stem of the word, or a slot-hint of the word. The ontological class of the words matched may be the LCS of the words matched.

In one embodiment, the similarity score is based on a function of at least a distance in ontological space between a semantic comprised in the subsequence and another semantic comprised in the other subsequence, a size of an intersection between attributes of the semantic and other attributes of the other semantic, or a morphological similarity between a word associated with the semantic and another word associated with the other semantic.

In one embodiment, the matching score is based on a function of a plurality of similarity scores for matched subsequences.

In one embodiment, the matched sequence comprises a matched subsequence that is matched against a query subsequence comprised in the query semantic, and wherein the matched subsequence is matched against a candidate subsequence comprised in the candidate semantic sequence.

In one embodiment, the invention comprises (403) finding the candidate semantic sequence for constraint-matching with the query semantic sequence, wherein the finding is based at least in part on a semantic comprised in the query semantic sequence.

In one embodiment, the invention comprises (404) determining a resulting semantic sequence chosen between the matched sequence and another matched sequence based at least in part on a comparison of the associated matching score and another associated matching score of the other matched sequence.

In one embodiment, the invention comprises: generating the query semantic sequence based at least in part on a sequence of semantic heads of sub-trees from a level of a natural language parse tree of a query sentence.

In one embodiment, the invention comprises: generating the received semantic sequence based at least in part a portion of leaves of a natural language parse tree of a sentence.

In one embodiment, the invention comprises: determining a slot-hint for a semantic in the query semantic sequence based at least in part on a named-entity-recognition function.

In one embodiment, the invention comprises: providing the query semantic sequence based at least in part on a sequence of semantic nodes in a natural language parse tree of a query sentence; determining an answer slot-hint for the query sentence; and retrieving an answer semantic from the matched sequence based at least in part on a comparison of a slot-hint of the answer semantic and the answer slot-hint.

In one embodiment, the invention comprises selecting the candidate sequence from a search result list provided by a query-expansion search for, in part, a search term based on the semantic.

In one embodiment, the invention comprises finding the candidate semantic sequence from a KB, a data base, a semantic network, a rule base, a neural-semantic network, or an information-retrieval store.

In one embodiment, constraint-matching the query semantic sequence with the candidate semantic sequence comprises at least a common subsequence match, a Rabin-Karp pattern match, a Knuth-Morris-Pratt pattern match, Boyer-Moore pattern match, or a Diff pattern match.

In one embodiment, constraint-matching comprises at least a weighted comparison of a portion of the query semantic sequence and another portion of the candidate semantic sequence based at least in part on a Lesk scoring, a cosine similarity function or another scoring function.

In one embodiment, the invention comprises: disambiguating an ontological class set of a semantic of the matched sequence based at least in part on a word-sense-disambiguation function.

In one embodiment, the invention comprises: generating the candidate semantic sequence based at least in part on a sequence of nodes of a natural language parse of a candidate sentence; and generating the query semantic sequence based at least in part on a sequence of nodes of a natural language parse of a candidate of query sentence.

In one embodiment, the invention comprises: before constraint-matching the query semantic sequence with the candidate semantic, determining a slot-hint for a semantic in the candidate semantic sequence or the query semantic sequence based at least in part on a named-entity-recognition function.

In one embodiment, the invention comprises: constraint-matching another generated query semantic sequence of the query sentence with another generated candidate semantic sequence of the candidate sentence to provide another matched sequence and another associated matching score; and; determining a resulting semantic sequence between the matched sequence and the other matched sequence based at least in part on a comparison of the associated matching score and the other associated matching score.

In one embodiment, the invention comprises: generating a plurality of found sequences based on a search result list provided by a query-expansion search for, in part, a search term based on a provided semantic, wherein the query semantic sequence and the candidate semantic sequence are comprised in the plurality of found sequences; if the matching score is above a threshold, determining a resulting semantic from the candidate sequence wherein the resulting semantic is associated with a slot-hint; and including the resulting semantic in the semantically matched knowledge structure.

In one embodiment, the provided semantic is another result semantic of another selected candidate sequence.

In one embodiment, the invention comprises, grouping a plurality of semantics comprised in the semantically matched knowledge structure.

In one embodiment, including the resulting semantic in the semantically matched knowledge structure comprises including the result semantic if a function of a size of the semantically matched knowledge structure is below a cut-off.

In one embodiment, the invention comprises, before determining the resulting semantic, determining a slot-hint for a semantic in the candidate sequence based at least in part on a named-entity-recognition function.

In one embodiment, the invention comprises, before determining the resulting semantic, determining a slot-hint for a semantic in the candidate sequence based at least in part on a named-entity-recognition function.

In one embodiment, the matching may occur using a dynamic programming table.

Figure 5:
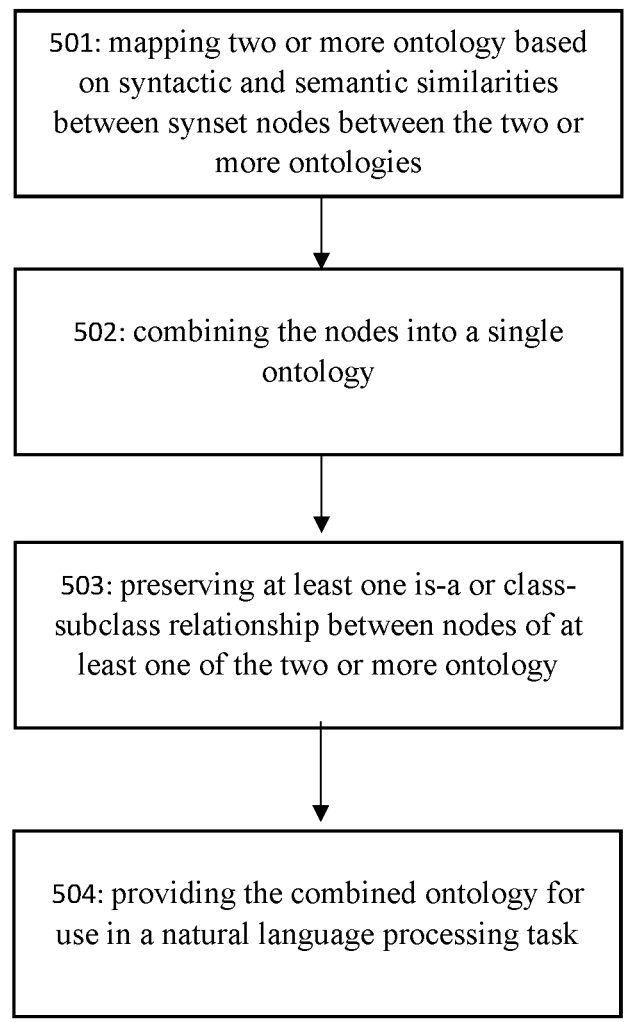

FIG. 5. Synset Ontology Unified from Two or More Ontologies

In one embodiment, a method, system, device and processor readable medium is directed to learning an ontology comprising: (501) mapping two or more ontology based on syntactic and semantic similarities between synset nodes between the two or more ontologies; and (502) combining the nodes into a single ontology. In one embodiment, the invention also comprises (503) preserving at least one is-a or class-subclass relationship between nodes of at least one of the two or more ontology. In one embodiment, the invention also comprises (504) providing the combined ontology for use in a natural language processing task.

In one embodiment, the mapping may be performed virtually to create a view of a combined ontology based on the two or more ontologies. For example, the view may be created with one ontology subsuming the other (e.g., the base ontology about common words/concepts is subsumed by an ontology only about computer science; for example, the senses for the word "run" in the base ontology may have one meaning (movement), but applying the second ontology, the word "run" may also comprise executing a program). In one embodiment, the combining may comprise subsumtion, rule-chaining, voting, averaging, choosing the sense base on frequency of usage, information gain measures, topic selection, or the like.

In one embodiment, the two or more ontologies comprises a separate ontology for different parts of speech, including nouns, verbs, adverbs, adjectives, or prepositions.

In one embodiment, the two or more ontologies comprises a separate ontology for different domain KBs, such as KBs for movies, for actors, and the like, In one embodiment, the syntactic and semantic similarities may be based on a subsequence matching of definitions (also known as glosses), the text of the nodes themselves or combinations thereof. In one embodiment, the similarities may be based on an information gain measure (e.g., Tf-Idf, measures used for Id3, etc.) based on matches of synonym words in one node and another node (e.g., node 1 has in common the base (stemmed) parts of words that are in node 2, and the distribution of such common words appear in nodes 1 and 2 more than would be expected to be randomly distributed across nodes, or otherwise does not appear in other nodes).

In one embodiment, the two or more ontology may comprise ontology received from one or more devices, including two ontology of the same part of speech.

In one embodiment, the combining may occur in an online learning mode, wherein the combined ontology is continuously provided over time as new information is received and processed as described above.

In one embodiment, the nodes may represent synsets for composite words, such as words representing a frame (e.g., "[animate entity] eating [edible entity] with an [instrument] in a [location]").

Figure 6:
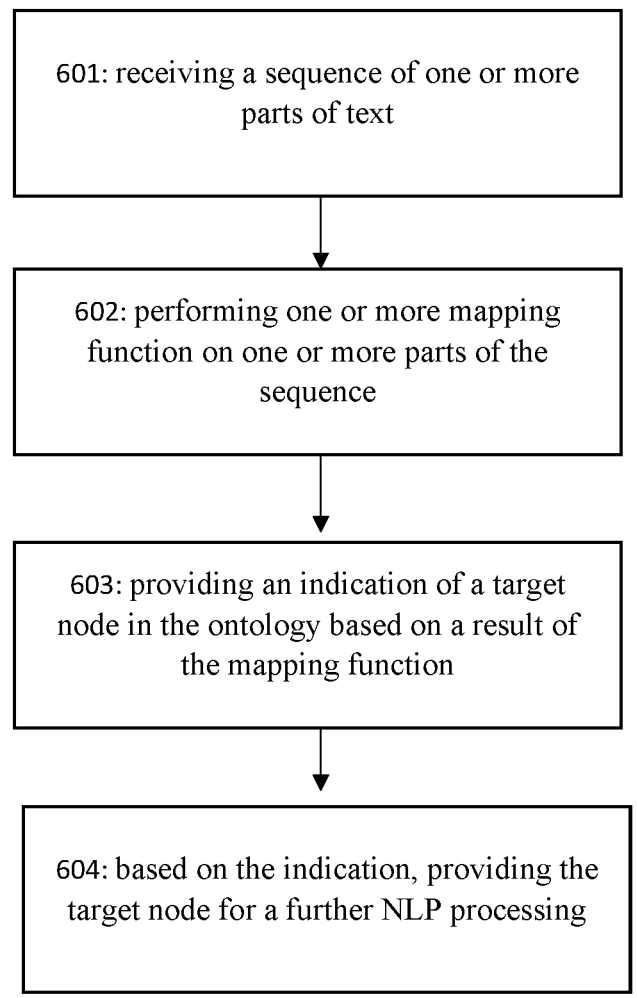

FIG. 6. Text to Ontology Node Mapping and Learning of Such Mapping

In one embodiment, a method, system, device and processor readable medium comprises mapping input text to one or more node in an ontology comprising: (601) receiving a sequence of one or more parts of text (e.g., words, word fragments, matches of words based on subsequence matching, etc.); (602) performing one or more mapping function on one or more parts of the sequence; (603) providing an indication of a target node in the ontology based on a result of the mapping function; and (604) based on the indication, providing the target node for a further NLP processing.

In one embodiment, the mapping function may be a hash function and lookup into a hash table for a symbol representing the node.

In one embodiment, the mapping function may be an orthographic based hash which preserves at least some ordering based on the order of letters (e.g., the word "mapping" produces a number close to the word "napping", but further away than a number based on "yule"). Such functions may comprise multiplication factors to each position in the word times the alphanumeric value.

In one embodiment, the mapping function may be a feature hashing function.

In one embodiment, the indication may be a dense semantic vector (e.g., produced by a word2vec algorithm, Hopfield network, self-organizing maps, or otherwise). In one embodiment, the target node may be found based on a search for the closets node to the semantic vector in a space of such vectors (e.g., using linear intersection detection in the N-dimensional space, bounding boxes, polygons, circles, etc., or other similar techniques).

In one embodiment, a method, system, device and processor readable medium comprises: one or more input layers of a neural network receives a vector representation of one or more relationships or context for a sense, and an output layer for the network is trained based on a target representation for the sense; training the neural network using one or more neural training methods, including convolution neural network, feed forward networks, recurrent networks, back-propagation, word2Vec training, or the like; extracting an internal representation of one or more internal layers of the neural network as a learned dense semantic vector of the sense. In one embodiment, the relationships comprise, is-a relationships, opposite relationships, part of relationships, or the like. In one embodiment, the context comprises surrounding words or senses based on one or more usage of the sense, a gloss of the sense, or the like. In one embodiment, the target sense may be a slot, frame or script. In one embodiment, the target sense may be a slot, frame or script with bindings between frames and slots (e.g., [self-move/actor:dog] [self-move/action:walk]). In ne embodiment, the input relationships may comprise one or more logical deduction rules, including transitive closure, or the like. In one embodiment, the learned dense semantic vector may be used to represent the applicable sense, may be used to index into an ontology for the sense, or the like, as further described herein. In one embodiment, the target sense is provided as target output to be predicted, and in another embodiment, the target sense is the input and the output is the context words or relationships to be predicted.

In one embodiment, the dense semantic vector may be used as input to another network, for example, as input for context senses around a predicted sense. In one embodiment, the other network is trained after a threshold of settling has been reached in the first network (including reduction in changes in the internal sense representations of the first network). In one embodiment, but networks are trained simultaneously or near simultaneously. In one embodiment, the networks may be chained together, connected in a graph, or the like wherein the dense semantic vector of one is used as context, relations or target of another, or the like. In one embodiment, two or more networks dense semantic vector may be combined as context, relations or target of another network.

In one embodiment, a sense (whether provided as input or output to be predicted) may be decomposed into two or more vectors, with each portion representing a facet (related information, such as parent, child, entailment, frame context, slot context, part-of, etc.) of the sense. In one embodiment, one part may represent the parent identifier and the other part represent the target identifier. For example:

[010000] [100000] may represent [animal: dog],
[010000] [000010] may represent [animal: man], and
may represents [man: cad] which is also referred to as a "dog".

In one embodiment, at least one of the parts on the vector may be the dense semantic vector learned from another network, or even from the same network (e.g., in a recurrent fashion). In one embodiment, the neural networks may be computed on separate devices and/or performed in a distributed fashion, such as described in FIG. 8.

Figure 7:
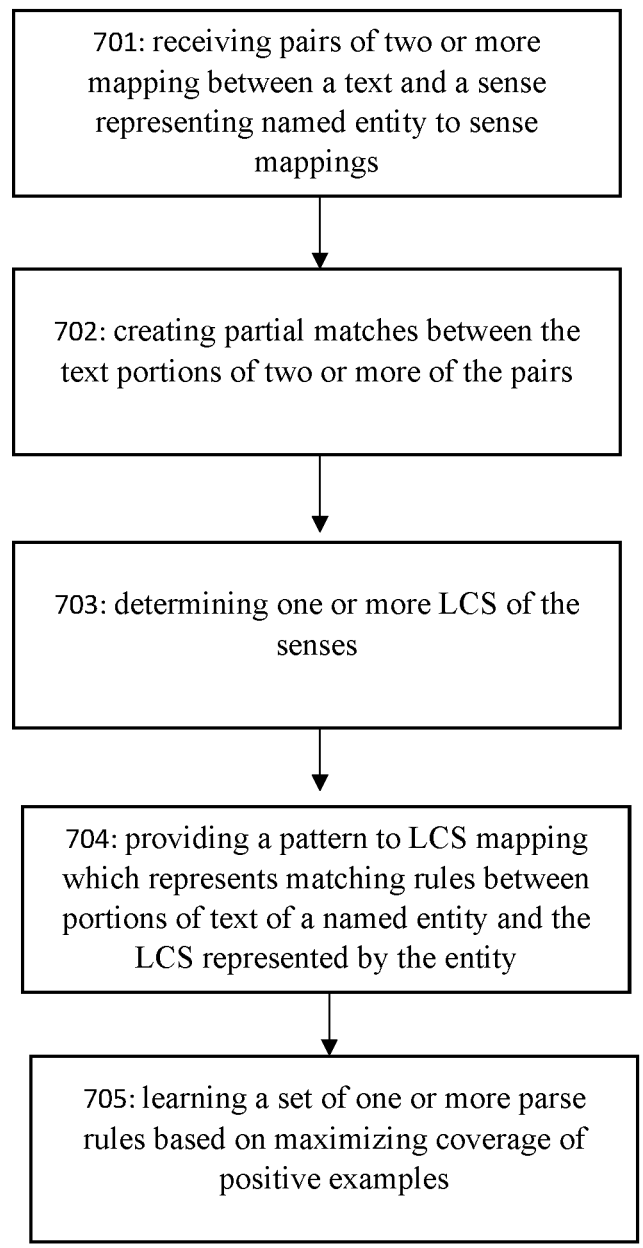

FIG. 7. Learning Semantic Parsers

In one embodiment, a method, system, device and processor readable medium comprises: semantic parsing comprising finding matching operation(s) based on an input and producing an output that represents a role labeling for the input. This output may comprise the labeling (tagging of the input itself), or construction of one or more other data structures or intermediate structures. The general goal of such parsers is to provide reasonable extraction of information from text. One form of extraction that is useful in and of itself and used with semantic parsing is named entity recognition. A named entity may be the proper nouns of companies, products, or people, or other multi-word nouns, or nouns representing some special class, like numbers or measurements. Other forms of parsers may find segments of text, or so called chunks of text, based on learning the mapping of input text to output text with segment indicators.

In one embodiment, a method, system, device and processor readable medium comprises: (701) receiving pairs of two or more mapping between a text and a sense representing named entity to sense mappings; (702) creating partial matches between the text portions of two or more of the pairs, wherein the matching comprises normalizing the text (stemming the words, change to lower case, removing stop words, etc.), normalizing the text without removing stop words, matching only the first N or the last N words (normalized or not), or the like; collecting senses from the pairs that are associated with a particular partial matches; (703) determining one or more LCS of the senses; (704) providing a pattern to LCS mapping which represents matching rules between portions of text of a named entity and the LCS represented by the entity, wherein each portion of text may have one or more LCS associated with it, and a count or other score may be associated with the mapping of the portion text to the LCS.

In one embodiment, the sense may also be combined with a segment indicator (e.g., beginning of a noun, verb, preposition phrase or the like and ending of a noun, verb, preposition phrase or the like.). For example, the output may be of the form "the/B-NP big dog/E-NP", with B-NP meaning beginning noun phrase, and E-NP meaning end noun-phrase. This process is sometimes referred to as chunking. The LCS may be performed on the sense portion of the output segment, while matching the other portions, for example based on a semantic-syntactic-parse as described above.

In one embodiment, the text may comprise a surrounding context for the named entity, comprises words before or words after, or topic words for a paragraph, or any other context sequence.

In one embedment, an information gain measure is applied to the score, thereby deriving a scoring of the applicability of a mapping rule and the likelihood of the LCS associated with the portion of text.

In one embodiment, the matching rules are applied to new text in order to tag the text, and to extract frame-slots from the text.

In one embodiment, a method, system, device and processor readable medium comprises (705) learning a set of one or more parse rules based on maximizing coverage of positive examples of mapping from input text to a combination of senses and indications of segments, and minimizing false positive coverage of examples. In one embodiment, the set is an ordered set, wherein a first parsing rule has higher positive coverage to negative coverage (false positive coverage) then a second parsing rule that is lower in the ordering, and wherein a rule higher in the ordering is applied before a rule lower in the ordering. In one embodiment, the input text comprises tags, named entity recognition and/or segment indication for text as well as words in the text. In one embodiment, a state representation of the example sentences is modified based on choosing a parse rules, such that the next parse rules chosen maximizes positives and minimizes negatives based at least in part of the example sentences with the prior rule or rules applied to the example sentences.

In one embodiment, the input text to sense and/or indication combination comprises at least one portion of text mapped to an LCS and/or segment indication as described above.

In one embodiment, the learned rules are applied to new text in order to tag the text, and to extract frame-slots from the text.

Figure 8:
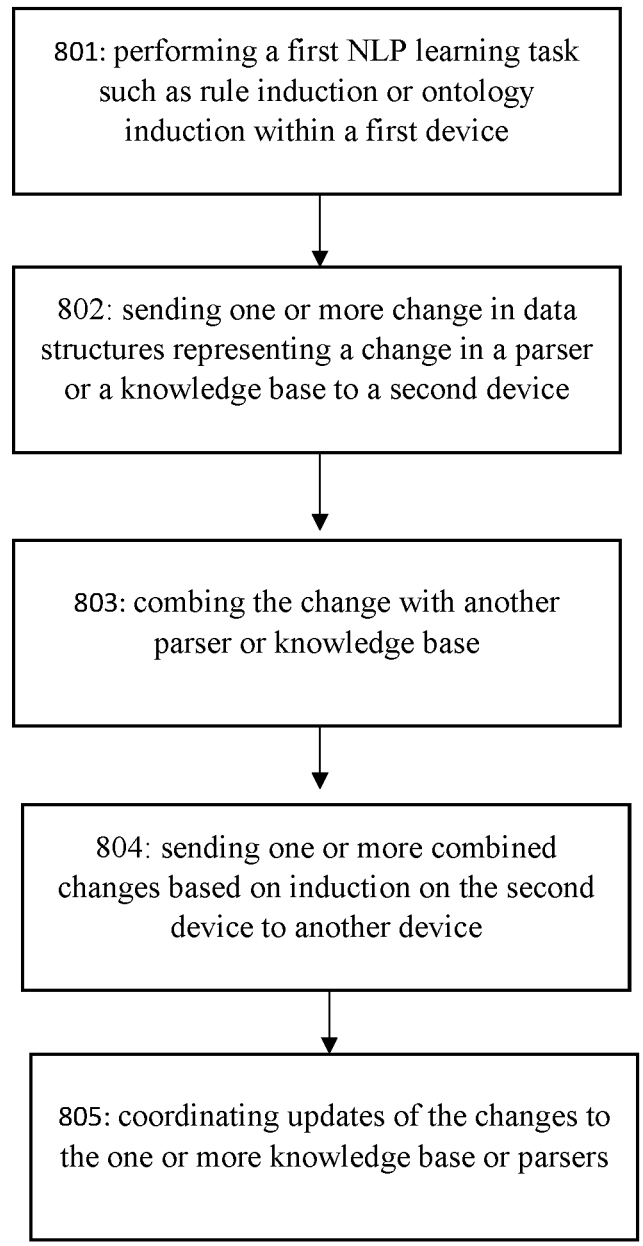

FIG. 8. Online Distributed Collaborative NLP Learning

In one embodiment, a method, system, device and processor readable medium comprises: (801) performing a first NLP learning task such as rule learning or ontology learning within a first device; providing one or more change in data structures representing a change in a parser or a KB; (802) sending the one or more change to a second device; receiving from the second device the change; (803) combing the change with another parser or KB; (804) sending one or more combined changes based on learning on the second device to another device, which may comprise the first device, wherein the parsers or KB between the two or more devices are at least a subset of each other. In one embodiment, the learning is based on text accessed on the applicable device performing the learning, including text provided through browsing, text messaging, spoken, or the like. In one embodiment, the invention comprises (805) coordinating updates of the changes to the one or more KB or parsers based on learning signals from other learning tasks. In one embodiment, coordinating is further performed on a mediator device that coordinates between two or more devices based on learning metrics. In one embodiment, the parsing and/or KB learned on the one or more device is used to perform the NLP tasks described herein.

For example, user A on device 1 may read a web page on Wikipedia.com for topics about Abraham Lincoln. A KB may have the knowledge of the instantiated frame "Kill" as follows [Kill-Killer: Booth] [Kill-Action: Shoot] [Kill-Victim: Lincoln] derived from previous applications of the NLP processes described herein. User A on device 1 may read on Wikipedia that:

"John W. Booth shot Lincoln"

Using the NLP processes described above applied on device 1, the following may be created and/or the knowledge is spread to one or more devices:

Rule (e.g., applying semantic-syntactic matching and rule learning): [person 1] shot [person 2]=>[Kill-Killer: person 1] [Kill-Action: Shoot] [Kill-Victim: person2]

And/or Assertion (e.g., applying such matching): [Kill-Killer: John W. Booth] [Kill-Action: Shoot] [Kill-Victim: Lincoln]

User B, reads a different webpage on device 2, on Wikipedia or otherwise about John F. Kennedy's assassination, where there is no knowledge about Oswald killing Kennedy in the applicable KB:

"Oswald fired a rifle at Kennedy"

Using the NLP processes described above applied on device 1, the following may be created and/or the knowledge is spread to one or more devices:

Rule (e.g., applying LCS matching between firing and shooting): [person 1] [action: firing] [device] at [person]=>[person 1] shot [person 2]

And/or Assertion (e.g., using rule chaining and such matching): [Kill-Killer: Oswald] [Kill-Action: Shoot] [Kill-Victim: Kennedy]

As is understood, the above is an example, and other forms of rules and knowledge may have learned, including with certainty factors, using semantic vector representations, or the like.

In one embodiment, a method, system, device and processor readable medium directed to retrieving a semantically matched knowledge structure, comprises: constraint-matching a query semantic sequence with a candidate semantic sequence based on maximizing a plurality of constraints, wherein at least one of the plurality of the constraints is a similarity score between a subsequence of the query semantic sequence and another subsequence of the candidate semantic sequence, wherein the constraint matching generates a matched sequence; providing one or more change in data structures representing a change in a parser or a KB based on the constraint-matching; sending the one or more change to a second device; receiving from the second device the change; combing the change with another parser or KB; and sending one or more combined changes based on learning on the second device to another device.

Figure 9:
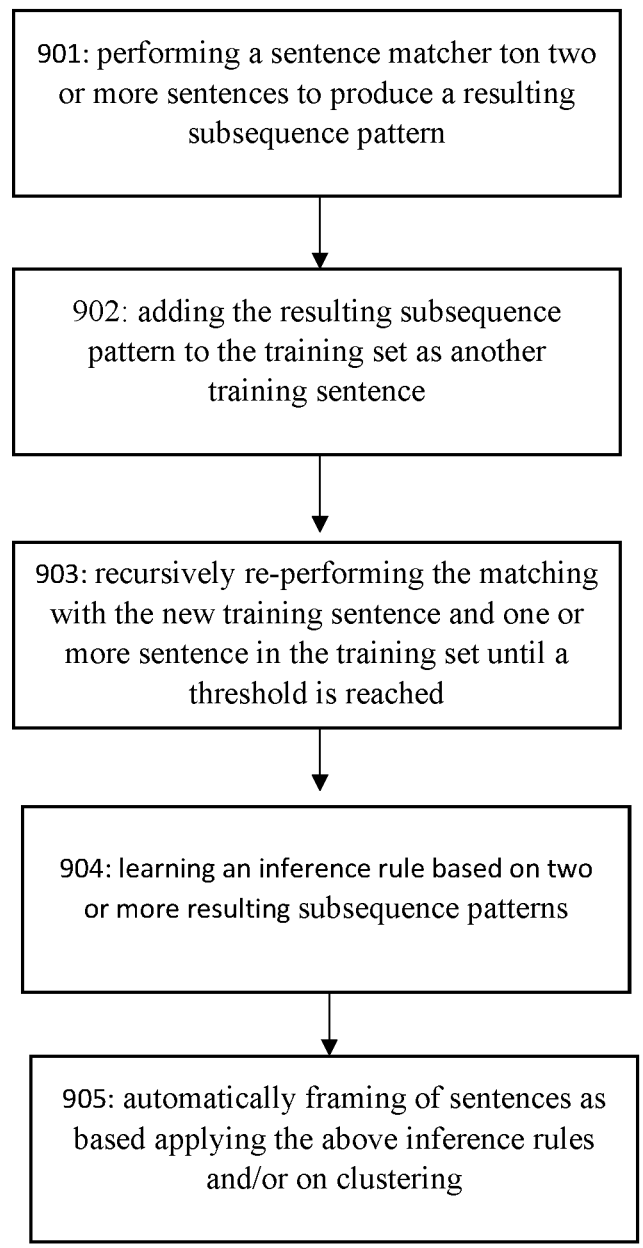

FIG. 9. Data Structure Learning and Auto-Filling of Data Structure Based on Frame/Slot Matching In one embodiment, a method, system, device and processor readable medium comprises: (901) performing the sentence matcher described previously to determine the general frame/slot segments for one or more sentences. In one embodiment, two or more sentences (e.g., different pairs of sentences from a corpora) are constraint matched to produce a resulting subsequence pattern. In one embodiment, the invention comprises: (902) adding the resulting subsequence pattern to the training set as another training sentence. In one embodiment, the invention comprises: 903: recursively re-performing the matching with the new training sentence and one or more sentence in the training set/corpora, and the matching continues until a threshold is reached, including if a resulting subsequence is too general, or too short.

In one embodiment, an information gain measure may be used to determine candidate subsequence patterns that may be high information patterns (e.g., general rules, frames, scripts or summaries). For example, if a pattern such as [animal] [consume action] [edible object] appears with a high information gain, this may be classified as a frame (e.g., animal-consume), and each of the matched symbol may be a slot.

In one embodiment, the framing rules may be applied to new sentences and one or more of the frame/slots may be produced (e.g., animal-consume/animal, animal-consume/action, etc.) and used as a summary. In one embodiment, the frame/slot can be used to suggest information tables/meta taggers for a page. For example:

A was born on X and grew up in Y.=>Table (A, X, Y) and (<PERSON>A</PERSON>, <DOB>X</DOB>, <HOMETOWN>Y</HOMETOWN>).

The table and/or resultant patterns may be of the form set forth in a relational database, may be visualized to the user as popup 320 or the like.

In one embodiment, the invention can also use summaries of frame/slots to link to similar information and/or pre-populate with links (e.g., appendix generators). For example, a reverse index, a search, or other similar methods may map person: A to one or more related links (e.g., person: Lincoln=>[URL for a website for Abraham Lincoln).

In one embodiment, (904) patterns or resulting subsequence patterns such as co-occurrence, may be used to learn rules, such as using an inductive learning approach.

For example, [animal] [consume action] [edible object] co-occurs with [animal] [sleep action]. A rule might be learned (including a certainty factor) based on the co-occurrence, information gain factor, clustering similarity, or the like.

For example, based on the following text:

The cat ate the catnip. . . . The cat fell asleep.

The following rule may be learned and considered a frame or script (with appropriate binding rules for the applicable slots):

[animal-A] [consume action] [edible object]=>[animal-A] [sleep action]

In one embodiment, the rule may have been derived based on a combination of learning described herein and rule-chaining. For example, based on the following text and background knowledge learned (using rule-chaining as well) as described herein:

The cat ate the catnip. . . . The cat snored.

[animal-A] [snore action]=>[animal-A] [sleep action]

The following rule may be learned and considered a frame or script (with appropriate binding rules for the applicable slots):

[animal-A] [consume action] [edible object]=>[animal-A] [sleep action]

In one embodiment, the script may be applied to new sentences, and hypothesis may be formed, such as given the sentence, "my dog ate his dog food" implies "my dog sleeps".

In one embodiment, other knowledge learning processes may be applied to the learned rules and assertions, including backwards deduction—e.g., the less logically sound guess, "my dog snored" implies "my dog ate food".

In one embodiment, a method, system, device and processor readable medium are directed to (905) automatically framing of sentences as set forth above further based applying the above inference rules and/or on clustering. A sentence is framed for' slots based on clustering word faceted sequence (e.g., a sequence with symbols having various facets associated with the parsed words—e.g., man/DT/human-male-entity/score:0.9 ran/VBD/action-run/score:0.8) associated to the elements of the sentence. In one embodiment, the word vectors are clustered by computing the similarity measures between the word vectors. In one embodiment, the similarity measure may be based on a modified longest common subsequence algorithm, as described herein.

In one embodiment, a method, system, device and processor readable medium are comprise framing a sequence of words into slots, comprising: selecting at least one subsequence of the sequence; associating at least one faceted sequence of words to the subsequence; computing a similarity measure between the at least one faceted sequence and a plurality of other faceted sequences, wherein at least one of the plurality of other faceted sequences is associated with the sequence, and wherein the similarity is based in part on a match of semantically similar common subsequences within the at least one faceted sequence and the at least one of the plurality; and clustering the similarity measure within a plurality of other similarity measures associated with at least one of the plurality to generate a plurality of clusters; providing a slot label for at least one of the plurality of clusters, wherein the similarity measure associated with the at least one faceted sequence is a member of the at least one of the plurality of clusters; and framing the subsequence with the slot label.

In one embodiment, clustering is performed using an unsupervised or semi-supervised learning method, including K-nearest neighbor, or the like. In one embodiment, the similarity measure between pairs of faceted sequences. In one embodiment, the clustering is a hierarchical clustering.

For example:

"A was born on X" may be the centroid of a cluster and represents the parent node.

"A was born on X and grew up in Y" may be close to the centroid, and represent a is-a child or subclass or hyponym or troponym of the centroid.

Framing may use the parent centroid for example as a first pass, and child sequence on subsequent refinement parsing as needed, to save processing or memory, for example.

Figure 10:
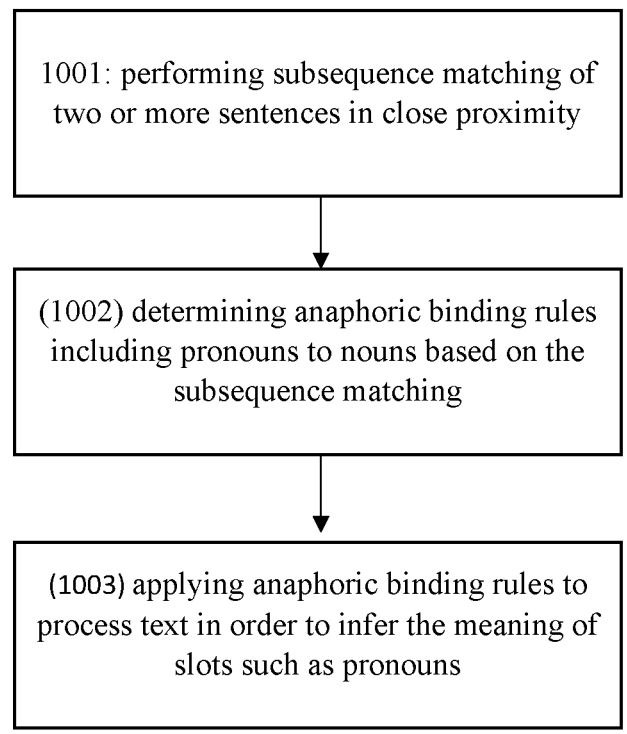

FIG. 10. Learnings of Anaphoric Binding Rules

In one embodiment, a method, system, device and processor readable medium comprises (1001) determining anaphoric binding rules, based on subsequence matching of two or more sentences in close proximity. For example:

The dog ate the food. . . . It fell asleep.

The cat ate the catnip. . . . The kitty took a nap.

The NLP matching described herein may create rules of the form as described above:

[animal-A] [consume action] [edible object]=>[animal-A] [sleep action]

[animal-B] [consume action] [edible object]=>it [sleep action]

In one embodiment, the invention comprises (1002) determining anaphoric binding rules including pronoun to nouns based on the subsequence matching. For example, a further match of the resultant rules for anaphoric slots (e.g., pronoun to noun mapping) may be warranted if enough other symbols also match syntactically and semantically. For example, the two patterns above have a high match, and therefore [animal-A] and "it" would match. Based on this match, a rule can be inferred that "it" refers to the [animal] mentioned in the previous sentence. An anaphoric rule may be of the form:

[animal-B] [consume action] [edible object]=>[it/PRP/animal-B] [sleep action]

The anaphor binding rules may be used for further processing, for example by (1003) applying anaphoric binding rules to process text in order to infer the meaning of slots such as pronouns, determining further inference rules, summarizing, text classification, or the like.

In one embodiment, a method, system, device and processor readable medium comprises determining anaphoric binding rules comprising: framing a sentence to generate a plurality of slot/frame/lemma triples; parsing another sentence in a same context as the sentence to generate a plurality of tag/lemma/tag-path triples; receiving a binding for one of the slot/frame/lemma triples and one of the tag/lemma/tag-path triples; generating a rule, wherein the left-hand-side of the rule comprises the plurality of slot/frame/lemma triples and the plurality of tag/lemma/tag-path triples, and wherein the right-hand-side comprises the binding; and performing a rule-learning generalizer based on the rule and at least one other anaphoric-binding rule to generate a generalized anaphoric-binding rule.

Figure 11:
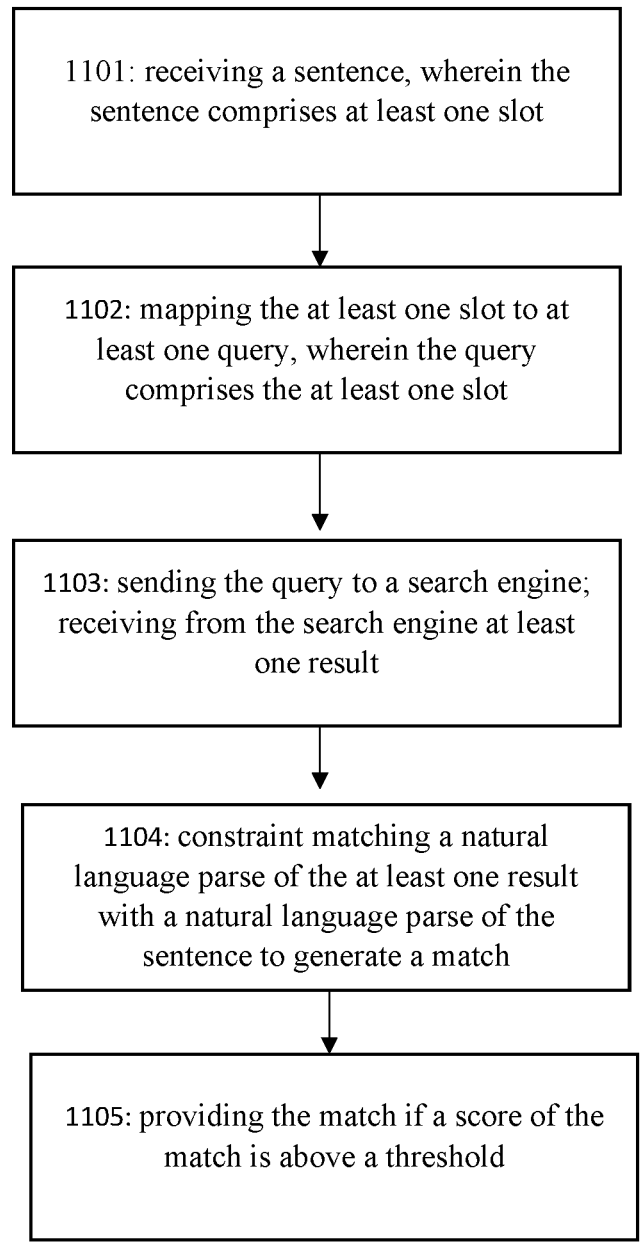

FIG. 11. Query Expansion and Generation for Sentence Matching

In one embodiment, a method, system, device and processor readable medium is used for querying a search engine using query expansion, sub-sentence querying and substitution, phrase matching and verification, comprising: finding example sentences that have similar meaning as a given sentence but may have a different form. The sentence is pre-tagged with certain slots. For example, given a sentence "<slot 1>a</slot>b<slot 2>c</slot>" we may find another sentence "<slot 2>c'</slot>d<slot 1>a'</slot>." In one embodiment, the matching process is syntactic and semantically based and thus will match both syntactically similarly (e.g., "on/PP top/NN of/PP" may match "at/PP the/DT top/NN of/PP"), as well as semantically similar patterns (e.g., "on the table/TYPE-OF-FURNITURE") and (e.g., "on the chair/TYPE-OF-FURNITURE"). In one embodiment, the invention comprises automating creating a KB of similarly meaning sentences of different forms as described above.

The query generator may map a sentence into a plurality of queries. Each of the plurality may have some, but not necessarily all of the slots in the sentence. Also, in some cases the slots may be generalized or converted into other similar forms. For example:

the mapping may comprise mapping similar idioms:
"pasta sauce goes on pasta"=>"pasta sauce is on top of pasta";
mapping to a semantic parent in an ontology:
"pasta sauce goes on pasta"=>"sauce goes on" [food: noodles];
mapping to a child or sibling in an ontology:
"pasta sauce goes on pasta"=>"sauce is put on pho"

Such expansions may be based on analogical, inductions, entailments inferences, or the like.

In one embodiment, based on the results, the NLP processes described herein may be used to further learn shallow semantic parsing rules, or perform other NLP tasks.

In one embodiment, a method, system, device and processor readable medium comprises (1101) retrieving a text over a network, comprising: receiving a sentence, wherein the sentence comprises at least one slot; (1102) mapping the at least one slot to at least one query, wherein the query comprises the at least one slot; (1103) sending the query to a search engine; receiving from the search engine at least one result; (1104) constraint matching a natural language parse of the at least one result with a natural language parse of the sentence to generate a match; and (1105) providing the match if a score of the match is above a threshold.

Figure 12:
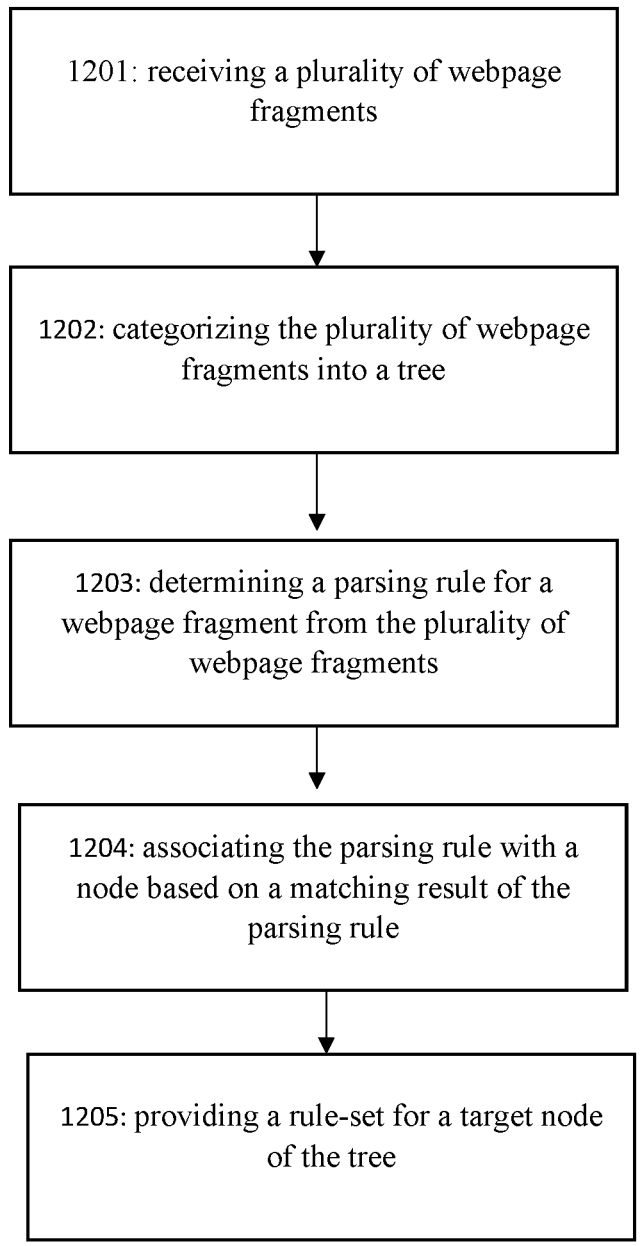

FIG. 12. Determining an Ontology of Sentence Parsing Rules Based on Graph Based Relationships Between Text Documents In one embodiment, a system, method, device and processor readable media are directed to site specific NLP parsing modules for frame parsing specific subjects and categories. Some sites, such as e-commerce sites, may have regularities in forms of text, such as reviews, product descriptions, or the like. These regularly formed sentences may be used to learn parsing rules for frame-based parsing automatically, semi-automatically, and/or manually tagged as further described herein. A set of parsing rules may be specific to the sites. A tree of rule-sets may be automatically formed for groups of sites based on regularities and similarities of rules/patterns.

For example, a node A may represent an e-commerce site. A child node B of A may represent a product description. A child node C of B may represent physical products. A child node D of B may represent services. A node E of A may represent product reviews. Each node's rules may subsume their parent node's rules. For example, a rule at E that is specific to product description sentences may be selected to frame-parse the sentence over a rule from A.

Web sites, based on their content (key words), pre-defined categorization (by the website owners, etc.), web address URL, or the like, may be categorized into at least one of the nodes, using clustering (e.g., K-NN clustering, neural self-organizing maps clustering, etc.). Text from these sites may be indexed in a KB for later retrieval.

A question may be parsed and frame based matched against the KB. The question may be categorized into at least one of the nodes and then frame searched into at least one of the categories of sites. Relevancy ranking may be based on how many/relevancy of results intra category and/or versus inter-category.

In one embodiment, a method, system, device and processor readable medium comprises creating sentence parsing rules, comprising: (1201) receiving a plurality of webpage fragments, wherein each webpage fragments correspond to at least one webpage and one website; (1202) categorizing the plurality of webpage fragments into a tree based on a relationship between a content, webpage, or website of at least one of the plurality of webpage fragments, wherein each node of the tree corresponds to at least one of the plurality of the webpage fragments. In one embodiment, categorizing comprises clustering of at least one of content, a markup tag, usage logs, and links to or from the webpage fragments. In one embodiment, the invention comprises: (1203) determining a parsing rule for a webpage fragment from the plurality of webpage fragments based on a parsing, lemmatizing, or framing of a sentence in the webpage fragment; (1204) associating the parsing rule with a node based on a matching result of the parsing rule; and (1205) providing a rule-set for a target node of the tree, wherein the rule-set comprises the parsing rules and another rule of at least one ancestor node of the target node, wherein an application of a lower parsing rule at a lower level in the tree subsumes a higher parsing rule at a higher level in the tree.

In one embodiment, the associating may comprise: associating the parsing rule with a target node associated with the webpage fragment if the parsing rule is unmatched with another parsing rule of a sister node, wherein the sister node is a child of a parent node of the target node or associating the parsing rule with the parent node if the parsing rule is matched with another parsing rule of a sister node, wherein the sister node is a child of a parent node of the target node.

In one embodiment, method, system, device and processor readable medium comprises creating sentence parsing rules, comprising: a processor operable to perform the actions comprising: receiving a plurality of webpage fragments, wherein each webpage fragments correspond to at least one webpage and one website, wherein at least a webpage fragment of the plurality of webpage fragments is associated with a member of a social network, and at least another webpage fragment is associated with another member in the social network; categorizing the plurality of webpage fragments into a tree based on a relationship between a content, webpage, or website of at least one of the plurality of webpage fragments, wherein each node of the tree corresponds to at least one of the plurality of the webpage fragments, and wherein categorizing comprises clustering of at least one of content, a markup tag, usage logs, links to or from the webpage fragments, and a degree of separation between the member and the other member in the social network; determining a parsing rule for a webpage fragment from the plurality of webpage fragments based on a parsing, lemmatizing, or framing of a sentence in the webpage fragment; associating the parsing rule with a target node associated with the webpage fragment if the parsing rule is unmatched with another parsing rule of a sister node, wherein the sister node is a child of a parent node of the target node; associating the parsing rule with the parent node if the parsing rule is matched with another parsing rule of a sister node, wherein the sister node is a child of a parent node of the target node; and providing a rule-set for the target node of the tree, wherein the rule-set comprises the parsing rules and another rule of at least one ancestor node of the target node, wherein an application of a lower parsing rule at a lower level in the tree subsumes a higher parsing rule at a higher level in the tree.

In one embodiment, a method, system, device and processor readable medium comprises data for creating sentence parsing rules, the data executable by a processor to perform actions, comprising: receiving a plurality of webpage fragments, wherein each webpage fragments correspond to at least one webpage and one website, categorizing the plurality of webpage fragments into a tree based on a relationship between a content, webpage, or website of at least one of the plurality of webpage fragments, wherein each node of the tree corresponds to at least one of the plurality of the webpage fragments, and wherein categorizing comprises clustering of at least one of content, a markup tag, usage logs, and links to or from the webpage fragments; determining a parsing rule for a webpage fragment from the plurality of webpage fragments based on a parsing, lemmatizing, or framing of a sentence in the webpage fragment; associating the parsing rule with a target node associated with the webpage fragment if the parsing rule is unmatched with another parsing rule of a sister node, wherein the sister node is a child of a parent node of the target node; associating the parsing rule with the parent node if the parsing rule is matched with another parsing rule of a sister node, wherein the sister node is a child of a parent node of the target node; and providing a rule-set for a target node of the tree, wherein the rule-set comprises the parsing rules and another rule of at least one ancestor node of the target node, wherein an application of a lower parsing rule at a lower level in the tree subsumes a higher parsing rule at a higher level in the tree.

In one embodiment, a method, system, device and processor readable medium comprises creating sentence parsing rules over a network, comprising: a first device operable to perform the actions comprising: tagging a first webpage fragment with information about at least one category of the first webpage fragment; sending the tagged first webpage fragment to a second device; a second device operable to perform the actions comprising: receiving a plurality of webpage fragments, wherein each webpage fragments correspond to at least one webpage and one website, and wherein the plurality of webpage fragments comprises the first webpage fragment categorizing the plurality of webpage fragments into a tree based on a relationship between a content, webpage, or website of at least one of the plurality of webpage fragments, wherein each node of the tree corresponds to at least one of the plurality of the webpage fragments, and wherein categorizing comprises clustering of at least one of content, a markup tag, usage logs, and links to or from the webpage fragments; determining a parsing rule for the first webpage fragment from the plurality of webpage fragments based on a parsing, lemmatizing, or framing of a sentence in the first webpage fragment; associating the parsing rule with a target node associated with the first webpage fragment if the parsing rule is unmatched with another parsing rule of a sister node, wherein the sister node is a child of a parent node of the target node; associating the parsing rule with the parent node if the parsing rule is matched with another parsing rule of a sister node, wherein the sister node is a child of a parent node of the target node; and sending at least one node of the tree to third device; and a third device, wherein the third device is the first device or a different device, the third device operable to perform the actions comprising: providing a rule-set for a target node of the tree, wherein the rule-set comprises the parsing rules and another rule of at least one ancestor node of the target node, wherein an application of a lower parsing rule at a lower level in the tree subsumes a higher parsing rule at a higher level in the tree.

Figure 13:
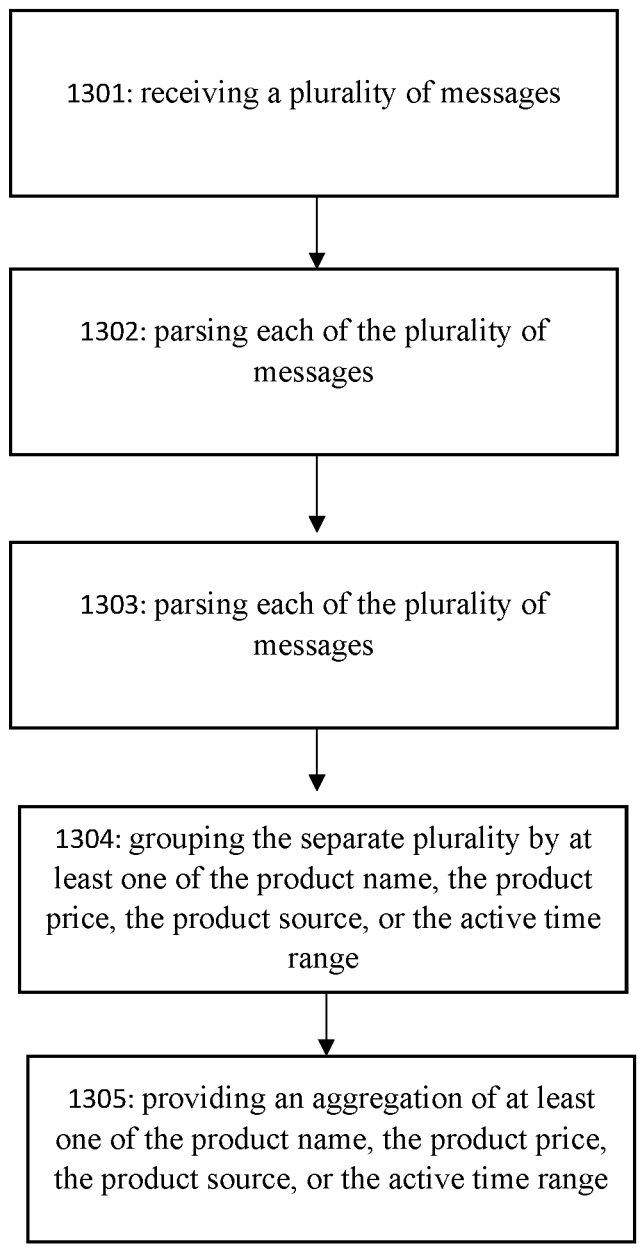

FIG. 13. Ad Server Based on Frame/Slot Matching

In one embodiment, a method, system, device and processor readable medium are directed to performing NLP analysis on an ad based sentence and receiving a payment for the ranking from an advertiser; based on an NLP match of the ad based sentence to the query and/or the query results, provide a website associated with the ad based sentence or advertiser. The NLP match can be the syntactic-semantic partial subsequence match, or the like.

In one embodiment, a method, system, device and processor readable medium comprises performing NLP analysis on an ad based sentence (e.g., "This widget is great!"); receiving a payment for the ranking from an advertiser; based on an NLP match of the ad based sentence to the query and/or the query results, provide a website associated with the ad based sentence or advertiser. In one embodiment, the NLP match can be the syntactic-semantic partial subsequence match described herein.

In one embodiment, a method, system, device and processor readable medium comprises organizing messages, comprising: (1301) receiving a plurality of messages; (1302) parsing each of the plurality of messages for at least an indication that the message is a promotion, and at least one of a product name, a product price, a product source, or an active time range; (1303) segregating a message of the plurality of message determined to have an indication that the message is a promotion into a separate plurality; (1304) grouping the separate plurality by at least one of the product name, the product price, the product source, or the active time range; and (1305) providing an aggregation of at least one of the product name, the product price, the product source, or the active time range.

In one embodiment, a system, method, device and processor readable medium comprises: providing disambiguation and/or parsing cues based on language usage by a user and/or another user within a social network of the user; collaboratively creating and refining of a NLP KB (e.g., using multiple devices) based on search usage and/or suggestions and tagging by users in a social network; suggesting a collection of images/video/items based on clustering of image shapes, sizes, color, and NLP; matching of text associated with each of the images; suggesting ordering of the collection based on above and time; determining a social network structure (e.g., hierarchical, graph based, etc.) based on language usage (e.g., based clustering of syntax and/or semantics) from postings, email archives, spoken text, or the like; and suggesting to one or more members of the social network, at least one item from the ordered collection.

Figure 14:
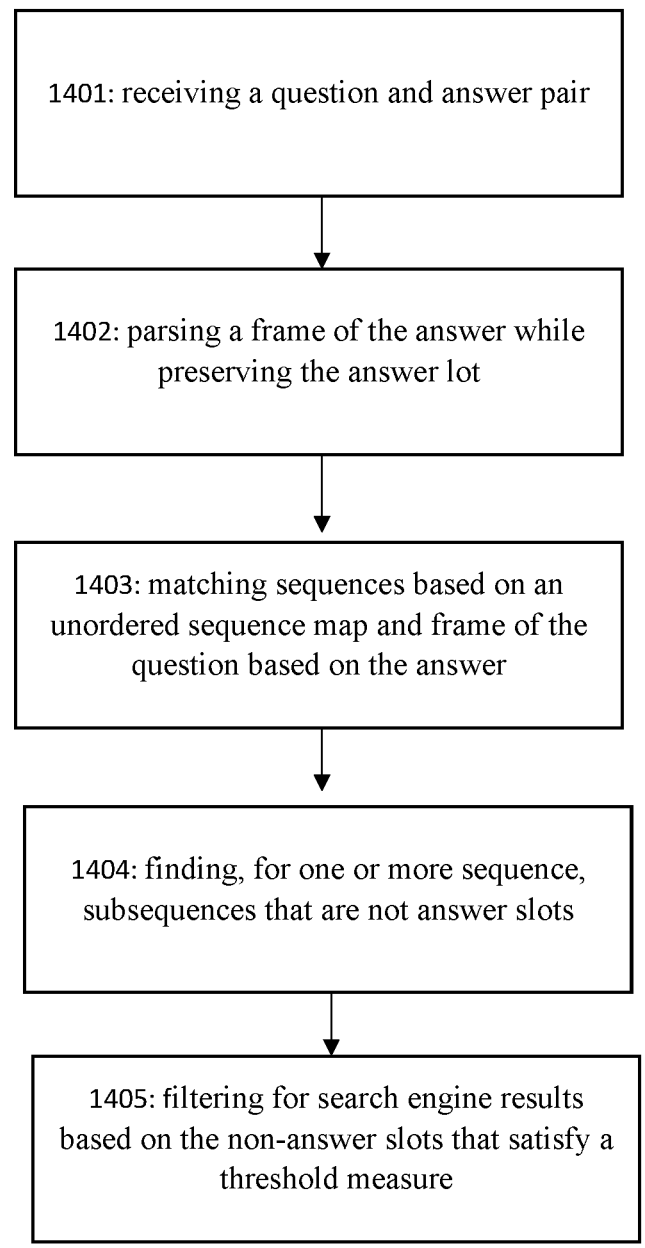

FIG. 14. Question Answering Using Subsequence Learning

In one embodiment, a method, system, device and processor readable medium is directed to learning a question answering rule base and finding candidate answers for a question based on the rule base. For example, given the pair:

"Who killed Lincoln?"=>"John W. Booth"

Sending to a search engine, the query "Who killed Lincoln?" AND "John W. Booth" or applying stemming and removing stop words, the query "Lincoln" AND "Booth". And receiving results:

"John Wilkes Booth shot Abraham Lincoln"

"Booth was Abraham Lincoln's assassin"

Using the NLP processes described herein, the following KB may be created and/or the knowledge is spread to one or more devices:

Inference rules (e.g., applying semantic-syntactic matching and rule learning):
   [person 1] shot [person 2]=>[Kill-Killer: person 1] [Kill-Action: kill] [Kill-Victim: person2]
And/or extraction pattern rules (e.g., applying semantic-syntactic matching and rule learning):
   Who [Kill-Action: kill] [Kill-Victim: person 1]?=> [Kill-Killer: person 2]
   [Kill-Killer: person 1] [Kill-Action: shoot] [Kill-Victim: person2]
   [Kill-Killer: person 1] [verb: be] [Kill-Victim: person2] Cs [Killer-Action: assassin (derived from the action assassinate)]
And/or Assertion (e.g., applying such matching): [Kill-Killer: John Wilkes Booth] [Kill-Action: Shoot] [Kill-Victim: Abraham Lincoln]

In one embodiment, based on the KB, find new candidate pairs of (question portion, answer portion), (question portion, non-question/non-answer portion), (answer portion, non-question/non-answer portion). For example, a non-answer/non-question portion of the results may be "shot" or "'s assassin". In one embodiment, non-answer/non-question portion may be the text surrounding immediately (or in proximity) of the question and/or answer. In one embodiment, information retrieval methods as may be used to identify high information phrases, such as "'s assassin" or "shoot" or "shot" as potential non-answer/non-question portions to use. In one embodiment, such pairs are recursively provided to the search engine or another search engine for further refinement of the KB. For example, the query "Lincoln" AND "'s assassin" may be sent to the to the search engine or another search engine for further refinement of the KB.

In one embodiment, the process above may be considered a seeding of the KB of question answering knowledge.

In one embodiment, a question query may be provided so that an answer may be extracted. In one embodiment, the questioning is performed on the seeded KB. In another embodiment, the questioning is provided on a KB that has not yet been seeded, and the questioning without an answer in the query may be used to seed the KB. In one embodiment, the questioning may further refine the KB. For example:

A question may be sent: "Who killed JFK?".
A subsequence mapping maps the query to the example query sequence: Who [Kill-Action: kill] [Kill-Victim: person 1]?
Pairs associated with the query, such as "JFK" AND "shot" or "JFK" AND "'s assassin" may be sent to the search engine as a query expansion.
Answers such as "Lee Harvey Oswald" may be extracted based on the learned sequence: [Kill-Killer: person 1] [Kill-Action: shoot] [Kill-Victim: person2], and the query results "Lee Harvey Oswald shot JFK".
Based on the question, answer, and non-question/non-question portions of the result, further KB refining and question answering processing may be performed.

In another embodiment, no rules are found in the KB perform the match as set forth above, and instead, only the query or a information retrieved extracted query ("killed JFK") may be sent to the search engine, and a candidate answer may be determined based on finding phrases within the search results with high information value using information retrieval measures (e.g., high frequency, close proximity, etc.). The candidate answers may be provided with the question as a question answer pair recursively to seed the KB as set forth above.

In one embodiment, a method, system, device and processor readable medium comprises (1401) receiving a question and answer pair; (1402) parsing a frame of the answer while preserving the answer lot; (1403) matching sequences based on an unordered sequence map and frame of the question based on the answer; (1404) finding, for one or more sequence, subsequences that are not answer slots; (1405) sending to a search engine (e.g., any information retrieval engine, including a web based search engine like Google, an embedded search engine running as an app inside a browser, or the like) such subsequences that have been matched as a query; performing a subsequence match based and frame of answer to search engine results (e.g., ordered or unordered subsequence match); filtering for results that satisfy a threshold measure; generalizing the results into KB that is smaller than the results; for the KB, sending a non-answer part and answer part pair of the KB to the search engine or another searching engine; recursively performing the parsing, wherein the KB are recursively added to and refined through different iterations, and wherein already searched pairs are not searched again; using the KB as part of a rule set for further NLP processing, including query expansion, and determining an answer based on a question query.

In one embodiment, a method, system, device and processor readable medium is directed to retrieving a semantically matched knowledge structure, comprises: receiving a question and answer pair, wherein the answer is received from a query of a search engine; constraint-matching a question with the answer based on maximizing a plurality of constraints, wherein at least one of the plurality of the constraints is a similarity score between question and answer, wherein the constraint matching generates a matched sequence; finding, for one or more answer sequences, a subsequence that are not parsed as answer slots; obtaining query results from another search engine based on a combination of the answer or question, and the non-answer subsequence; refining a KB based on the query results and the constraint matching.

Figure 15:
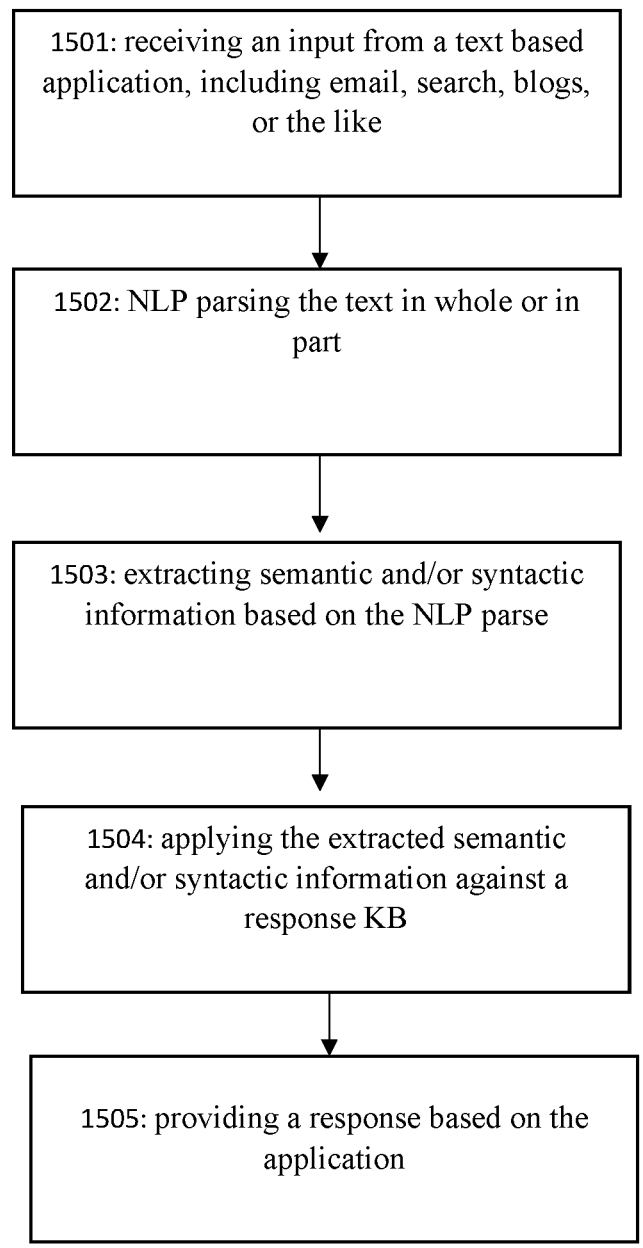

FIG. 15. Discourse Assistance.

In one embodiment, a method, system, device and processor readable medium comprises (1501) receiving an input from a text based application, including email, search, blogs, or the like; (1502) NLP parsing the text in whole or in part; (1503) extracting semantic and/or syntactic information based on the NLP parse; (1504) applying the extracted semantic and/or syntactic information against a response KB; and (1505) providing a response based on the application. In one embodiment, the response KB may be a chat-bot rule-set for responses such as an Eliza-like system, an expert system, or the like. In one embodiment, based on a first extracting, determining which of a plurality of response KB to apply. For example, if the first extraction indicates "eating out", "arts and entertainment", "feelings", etc. topic or frame, the applicable response KB may be applied. The KB may be any form of KB with the appropriate domain responses. The responses may comprise suggestions for similar topics, similar nouns or noun phrases, similar search queries, conversation responses ("Sounds great!", "I'll meet you at the restaurant", "I see that you are writing a formal letter, may I suggest these templates", "You don't like the movie [content:movie 1], maybe you might like [content: movie 2]", or the like), or the like. In one embodiment, the responses may be learned and/or otherwise constructed by the methods described herein.

In one embodiment, a method, system, device and processor readable media is directed to determining recipient specific sections in an email or another message. In one embodiment, the message is provided to one or more users. When a user sends emails, SMS, etc., the user may want certain people to focus on certain sections, and in some cases, the user may not want certain people to see certain sections. In one embodiment, the section may be marked as important or relevant to the user and/or recipients based on the NLP processes described herein.

In one embodiment, the invention comprises receiving a determination from the user which specific sections should be copied to which recipients even when carbon coping or sending to several recipients. The unwanted text may be displayed as hidden text, and only viewable if the user has a password (via client server pull down of the text, or as decryption of the text). The text is sent in a MIME format and can be opened in common email programs, and may be opened in a custom app.

In another embodiment, a user interface is used to send only specific portions of an email to people based on the processes set forth above. The recipient people can respond to the thread. The original user can allow the recipient to see more of the thread if the user wants, by, for example, decrypting the file, sending a password, or the like.

In one embodiment, the NLP processes described herein may be embedded inside the app or inside the message itself (e.g., part of a web page email). The NLP methods may be used to parse the text based on context, such as subject matter. For example:

Recipient may have responded in the past mentioning Topic 1.

Text in the current message is parsed to find Topic 1 (e.g., using semantic parsing, LCS processing, sequence matching, etc.).

In another embodiment, the NLP processes described herein could parse the message at any time in the lifecycle of the message (from the time the user receives the message, decides which portion of the email to send, send all or part of the message, when it is received by other user to surface interesting text to the other user based on topics, etc.). In another embodiment, a messaging assistant may be provided to a user to surface information about text currently being drafted in a message, to provide suggestions, to provide context, or the like. A user may use a speech recognition system as generally known in the art to dictate a message, and in the course of dictating, speech is translated to text, and text is parsed with the NLP methods described herein. The shall semantics of the text may surface topics of interest, sentiment of the speaker, etc. The program may suggest for example, based on topic and/or sentiment other topics. For example:

User types to friend: "This movie sucks. I like action but this blows".

The program may respond: "You may want to see a cool action movie this Friday that has high review. Suggest this to your friend?".

The frame matching may match the slot-frame(s) using the following subsequence rules:

[sense: content] [sense: sentiment].

[sense: like] [sense: content] but this [sense: sentiment]

The sense matcher may match [action] to [sense: content] in the second sentence for example, because action may have been learned as such. Moreover, an anaphor matcher may match the [sense: content] between the two sentences, and take an LCS of the two to derive [sense: movie].

The case frames involved comprise movie watching, and the sentiment analysis detects words and patterns such as "sucks" and "blows". The rule learned by the NLP processes described herein may be for example:

[media: movie] and [sentiment] is [dislike]=>suggest new [media: movie] with [sentiment] [like].

The learning may occur through standard methods, including supervised, semi-supervised, or unsupervised methods, clustering, information gain analysis, or the like.

The above embodiment could be used for any method of discourse, text, messaging, including SMS, partial speech and partial text, sign-language interpretation using visual analysis, etc.

In one embodiment, a method, system, device and processor readable medium comprises: retrieving a semantically matched knowledge structure, comprises: receiving an input sequence from a text based application, including email, search, blogs, or the like; constraint-matching the input sequence with a candidate semantic sequence in a KB based on maximizing a plurality of constraints, wherein at least one of the plurality of the constraints is a similarity score between a subsequence of the query semantic sequence and another subsequence of the candidate semantic sequence, wherein the constraint matching generates a matched sequence; providing one or more change in data structures representing a change in a parser or a KB based on the constraint-matching; sending the one or more change to a second device; extracting semantic and/or syntactic information based on the constraint-matching; applying the extracted semantic and/or syntactic information against a response KB; and providing a response based on the application.

Figure 16:
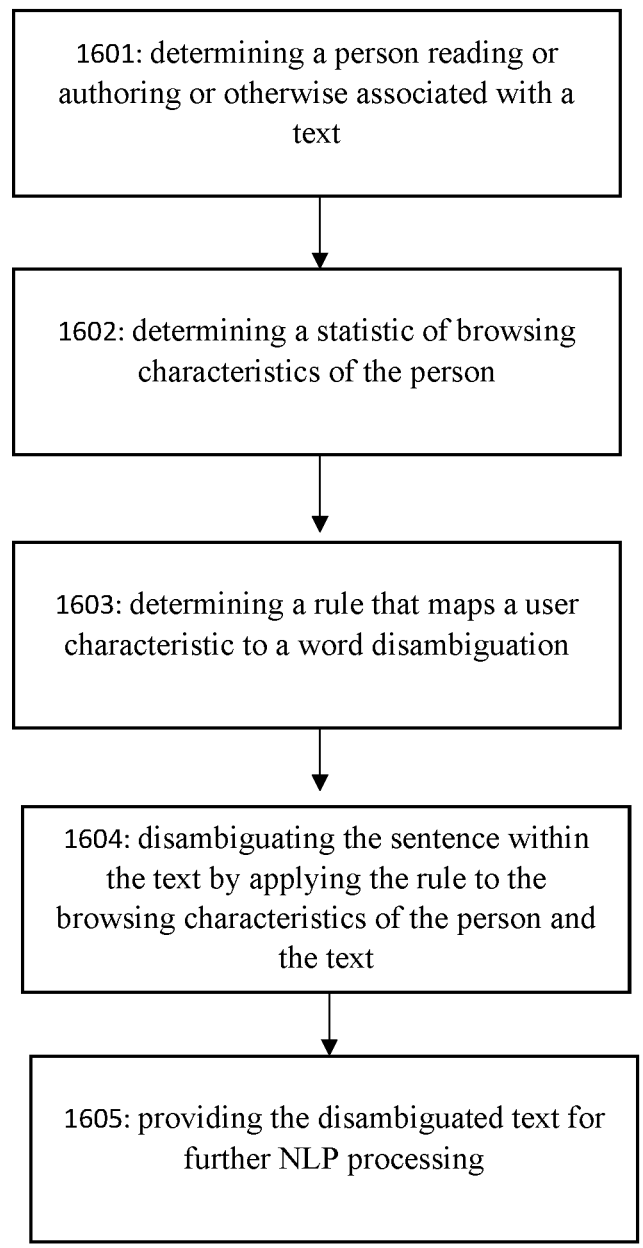

FIG. 16. Contextual Parsing of Text Based on a Location, Time and/or Social Network In one embodiment, a method, system, device and processor readable medium comprises disambiguating words in a sentence comprising: (1601) determining a person reading or authoring or otherwise associated with a text; (1602) determining a statistic of browsing characteristics of the person, wherein the characteristics comprises location, time, and amount of content browsing, and wherein the characteristics comprises content browsed by the person; (1603) determining a rule that maps a user characteristics to a word disambiguation; (1604) disambiguating the sentence within the text by applying the rule to the browsing characteristics of the person and the text; (1605) providing the disambiguated text for further NLP processing.

An example of a rule of the following form may be derived: If author browses from a computer in Texas, when author's text uses the word "Paris" in a location slot in a local travel frame, "Paris" most likely means "Paris Tex." For example, the author may type the text:

Driving to Paris tonight.

In one embodiment, the NLP methods described herein are used to parse the text, derive rules for knowledge extraction, named entity recognition, etc., and based on the parsed text. Supervised and semi-supervised methods are used to learn rules, such as by co-occurrence, decision trees, or the like. For example, when the global positioning system (GPS) values for the location of the author (or a reader) is within the state of Texas, and cities in Texas are mentioned (e.g., using an information gain measure) in text related to local travel, infer the rule set forth above.

In one embodiment, a system, method, device and processor readable medium comprise parsing natural language text, comprising: receiving a text; receiving a first context of an author associated with the text; receiving a second context of a consumer of the text, wherein the first or second context comprises at least one of a location, a time or a membership in a social network; retrieving other text authored or consumed at the first or second context; parsing the text based on the other text, comprising at least one of disambiguating a word in the text based on the other text, selecting a tree parse from a plurality of tree parses of the text based on the other text, or framing the text based on the other text.

In one embodiment, a system, method, device and processor readable medium comprise parsing natural language text, comprising: a processor operable to perform the actions comprising: receiving a text; receiving a first context of an author associated with the text; receiving a second context of a consumer of the text, wherein the first or second context comprises at least one of a location, a time or a membership in a social network; retrieving other text authored or consumed at the first or second context; parsing the text based on the other text, comprising at least one of disambiguating a word in the text based on the other text, selecting a tree parse from a plurality of tree parses of the text based on the other text, or framing the text based on the other text.

In one embodiment, a system, method, device and processor readable medium comprise data for parsing natural language text, the data executable by a processor to perform actions, comprising: receiving a text; receiving a first context of an author associated with the text; receiving a second context of a consumer of the text, wherein the first or second context comprises at least one of a location, a time or a membership in a social network; retrieving other text authored or consumed at the first or second context; parsing the text based on the other text, comprising at least one of disambiguating a word in the text based on the other text, selecting a tree parse from a plurality of tree parses of the text based on the other text, or framing the text based on the other text.

In one embodiment, a system, method, device and processor readable medium comprise parsing natural language text over a network, comprising: a first device operable to perform the actions comprising: receiving a sentence; transcoding the sentence into a text; providing at least a portion of the text to a second device; and a second device associated with either a speaker or listener of the sentence, the second device operable to perform the actions comprising: receiving a portion of the text; determining a first context of an author associated with the text; determining a second context of a consumer of the text, wherein the first or second context comprises at least one of a location, a time or a membership in a social network; retrieving other text authored or consumed at the first or second context; parsing the text based on the other text, comprising at least one of disambiguating a word in the text based on the other text, selecting a tree parse from a plurality of tree parses of the text based on the other text, or framing the text based on the other text.

Figure 17:
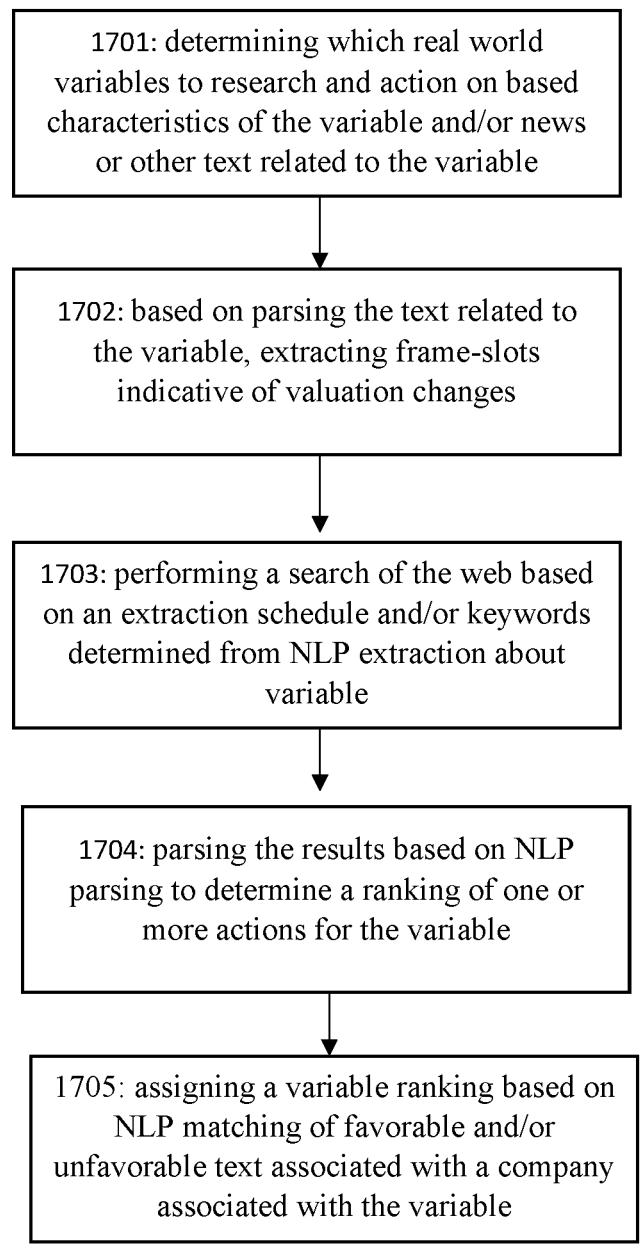

FIG. 17. Decisioning Research and Actioning Based on NLP Parsing

In one embodiment, a system, method, device and processor readable medium comprises: (1701) determining which real world variables to research and action on based on a characteristic of the variable and/or news or other text related to the variable; (1702) based on parsing the text related to the variable, extracting frame-slots indicative of valuation changes (including sentiment changes, changes in company status, changes in market, or the like); and providing the extraction. In one embodiment, the extraction is provided in combination with other information about the variable, including price of variable, changes, etc. In one embodiment, the extraction is provided as a numerical value, such that a change over time of the value may be a used to evaluate the variable. In one embodiment, the variable may be the level of employment, commodities available for consumption, equities or debts (including price, volume, and changes thereof), popularity of a good, and so forth. In one embodiment, the variable is changing in real time or near real-time.

In one embodiment, a system, method, device and processor readable medium comprises: creating a schedule of research based on the extraction and one or more information about the variable; (1703) performing a search of the web based on the schedule and/or keywords determined from NLP extraction about variable; (1704) parsing the results based on NLP parsing to determine a ranking of one or more actions for the variable (e.g., trading, selling, lower production of, increasing production of, or the like, based on for example if the ranking is favorable, not favorable, long, short, etc.). In one embodiment, a system, method, device and processor readable medium comprises assigning a variable ranking based on NLP matching of favorable and/or unfavorable text associated with a company associated with the variable. In one embodiment, a system, method, device and processor readable medium comprises automatically auctioning the variable based on the ranking.

Figure 18:
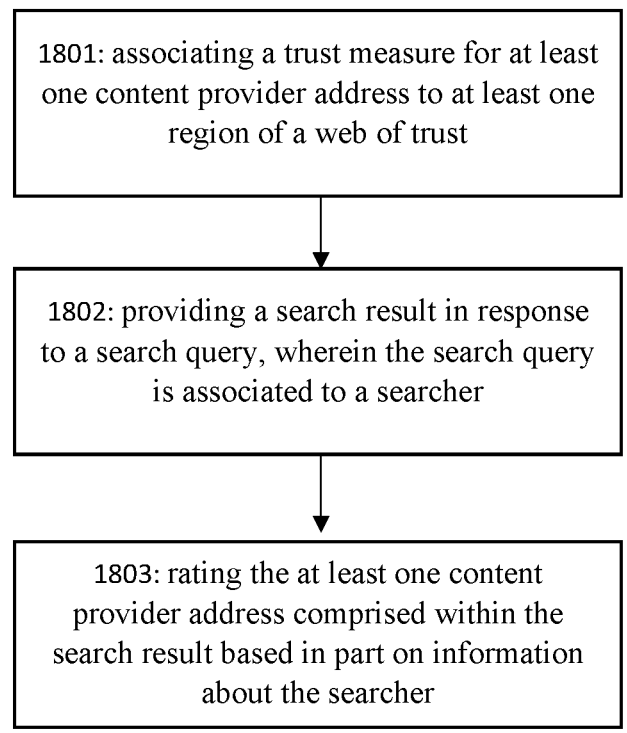

FIG. 18. A Web of Trust Measure for Search Results Based on NLP Parsing

In one embodiment, a method, system, device and processor readable medium are directed to providing a trust measure for search results. A plurality of raters provides a trust measures for a site. A search result is provided based on a searcher's search query. The search result indicates an overall trust measure for an associated site. The overall level of trust may be computed based on the searcher's parsed natural language statements, and/or membership in a web of trust, wherein at least some of the raters are associated to at least some groups in the web of trust, the distance between the membership of the searcher and the raters' associated group, the plurality of trust measures for the site provided from the raters, and the search query. A trust measure may comprise a plurality of dimensions, including quality of service (delivery, customer service, returns, or the like), reputation, informativeness, or the like.

In one embodiment, a method, system, device and processor readable medium provide a trust measure for a search result, comprising: (1801) associating a trust measure for at least one content provider address to at least one region of a web of trust; (1802) providing a search result in response to a search query, wherein the search query is associated to a searcher; and (1803) rating the at least one content provider address comprised within the search result based in part on information about the searcher. In one embodiment, the information comprises an associated trust measure and a distance between the membership and the region of the web of trust associated with the associated trust measure. In one embodiment, the information comprises whether the searcher is associated to a membership in the web of trust. In one embodiment, the web of trust is a social network.

In one embodiment, the information is based on a NLP parsed statement made by the searcher or another person in the web of trust. For example, the searcher may have left a review or sent a message to a friend that indicates that the address is trusted or favored. For example, the NLP methods set forth herein may categorize the sentiment of the statement and extract the address—e.g., "CNN.com rocks!"

Figure 19:
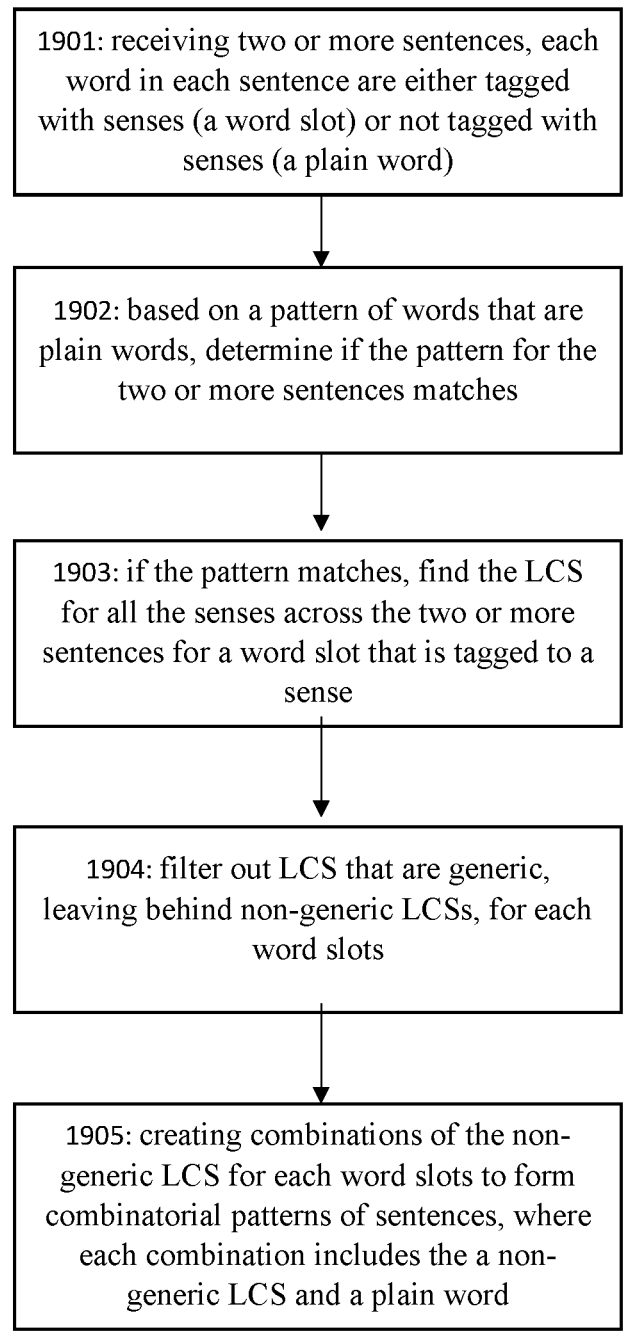

FIG. 19. Creating Combinations of Sentence Constraint Matched Sentences Based on the LCS of Select Words In one embodiment, two or more sentences are constraint matched based on one or more LCS of word slots in the two or more sentences, in order to create combinations of patterns for used in parsing generalized and semantically matched sentences. For example, given the three sentences:
1. The [dog] sat at the [bank]
2. The [chow chow] sat at the [shore]
3. The [man] sat at the [building]

Given that the sense [dog] has two senses [cad] or [canine], and given that the sense [bank] has the two senses [financial building] or [river bank].

The embodiment of the invention determines that the pattern across these sentences is "The @1 sat at the @2" where @1 and @2 are word slots, and further computes the LCS for @1 as [man] between sentences 1 and 3, and [canine] between sentences 1 and 2, and @2 as [shore] between sentences 1 and 2, and [building] between sentences 1 and 3 The embodiment, generates the patterns: The [man] sat at the [building], and The [canine] sat at the [shore] as the combinations generated. For example, the generic measure may be a function of how close the LCS sense is to the root node of an ontology. For example, if the LCS is the root node, then the LCS is filtered out. In one embodiment, the LCSs are filtered to remove generic LCS. For example, if the @1 is determined to be the LCS between [man] and [plant] instead of [dog], deriving [entity], and [entity] is close to or is the root node in the ontology, the LCS is removed from the computation of combinations.

In one embodiment, two or more sentences are received wherein each word in each sentence are either tagged with senses (a word slot) or not tagged with senses (a plain word) (1901). In one embodiment, based on a pattern of words that are plain words, the pattern for the two or more sentences is determined or match or not (1902). If the pattern matches, the LCS is found for all the senses across the two or more sentences for a word slot that is tagged to a sense (1903). In one embodiment, LCS that are generic are filtered out, leaving behind non-generic LCSs, for each word slots (1904). In one embodiment, combinations of the non-generic LCS are created for each word slots to form combinatorial patterns of sentences, where each combination includes the a non-generic LCS and a plain word.

Figure 20:
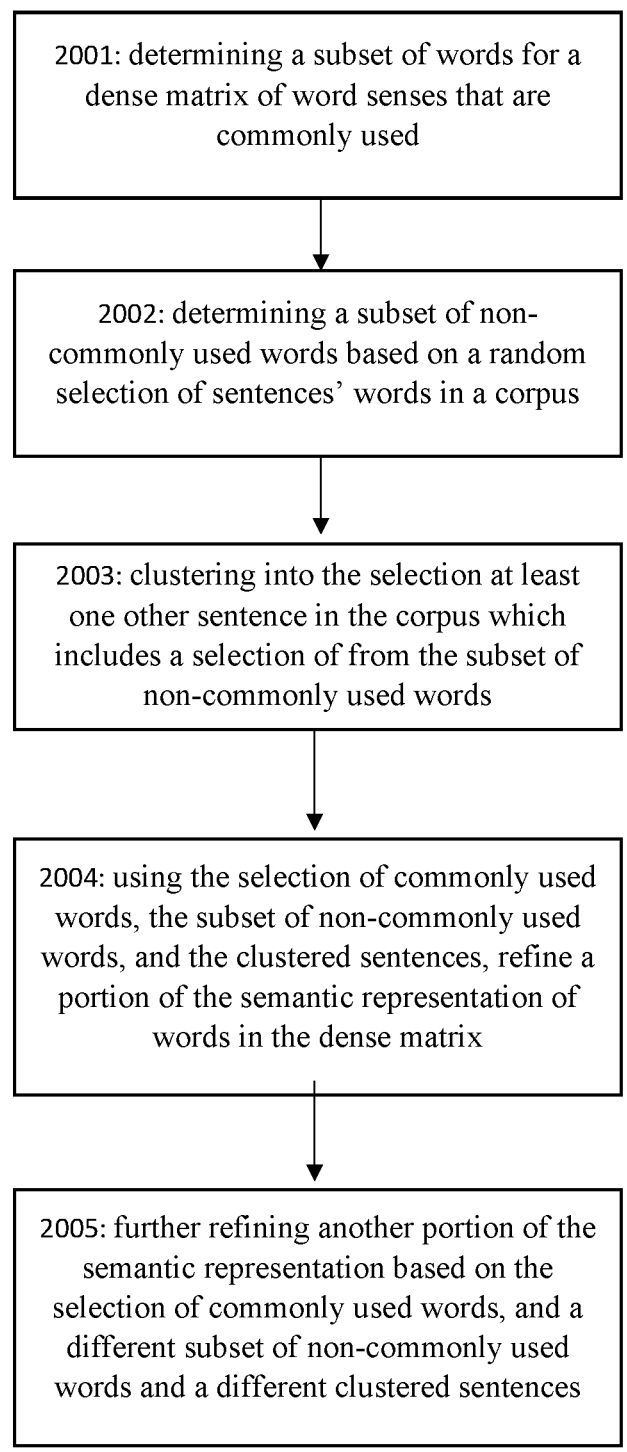

FIG. 20. Out of Core Training of Dense Semantic Representations Based on Sub-Network and Sub-Corpus Selection In one embodiment a dense matrix semantic network is trained in parts in order to compute semantic meaning of words represented b the matrix. The training may be performed out-of-core, in order to reduce usage of RAM, wherein a part of the matrix may be trained in memory at a time. In one embodiment, the network may be trained by one or more processors, and/or one or more devices. In one embodiment, the training may be a word2vec, item2vec or similar algorithm.

In one embodiment, a subset of words for a dense matrix of word senses that are commonly used is determined (2001). The determination may be based on a word count. For example, the words with the highest 10% word count may be used as the subset. In one embodiment, a subset of non-commonly used words is determined based on a random selection of sentences' words in a corpus (2002). For example, a random selection of two or more sentences from a training corpus is selected, and the common words are removed. The remaining words are the subset of non-commonly used words for this random selection. In one embodiment, at least one other sentence in the corpus which includes a selection of from the subset of non-commonly used words is clustered into the selection (2003). For example, given the non-commonly used words, finding sentences in the corpus that has an intersection with words in the non-commonly used words. Given multiple non-commonly used words sets, the sentence that are found to have the highest intersection with any particular non-commonly used words sets are clustered into the related sentence set for that non-commonly used words set. In one embodiment, using the selection of commonly used words, the subset of non-commonly used words, and the clustered sentences, a portion of the semantic representation of words in the dense matrix is refined (2004). For example, a portion of the matrix associated with the commonly used words and the subset of non-commonly used words are loaded into RAM, and the clustered sentences are trained on that network. If a word in the clustered sentences are not in the portion of the matrix, the word is ignored. In one embodiment, another portion of the semantic representation based on the selection of commonly used words, and a different subset of non-commonly used words and a different clustered sentences is further refined (2005). In one embodiment, the multiple refinement may occur in sequence or in parallel, on the same CPU or GPU or on multiple CPUs or CPUs, in multiple devices, or the like.

The above specification, examples, and data provide a complete description of the manufacture and use of the composition of the invention. It is understood that the titles of the FIGURES are non-constraining and the description thereof can be directed to many embodiments. The method steps described may be used as described in combination with the other method steps described pursuing to the scope of the invention. Since many embodiments of the invention can be made without departing from the spirit and scope of the invention, the invention also resides in the claims hereinafter appended.

What is claimed as new and desired to be protected by Letters Patent of the United States is:

1. A system for retrieving a semantically matched knowledge structure, comprising:
   a first device for refining at least a portion of an ontology;
   a network for communicating data; and
   a second device connected to the first device through the network, wherein the second device performs steps comprising:
      constraint-matching a query semantic sequence received through the input component with a candidate semantic sequence stored on the memory component based on maximizing a plurality of constraints,
         wherein at least one of the plurality of constraints is a similarity score between a subsequence of the query semantic sequence and another subsequence of the candidate semantic sequence, and
         wherein the constraint matching generates a matched sequence and an associated matching score;
      finding the candidate semantic sequence for constraint-matching with the query semantic sequence, wherein the finding is based at least in part on a semantic comprised in the query semantic sequence; and
      providing a resulting semantic sequence chosen between the matched sequence and another matched sequence based at least in part on a comparison of the associated matching score and another associated matching score of the other matched sequence.

2. The system of claim 1, wherein the steps further comprise:
constraint-matching another generated query semantic sequence of a query sentence with another generated candidate semantic sequence of a candidate sentence to provide the other matched sequence and other associated matching score; and
determining the resulting semantic sequence between the matched sequence and the other matched sequence based at least in part on a comparison of the associated matching score and the other associated matching score using a cosine similarity function.

3. The system of claim 1, wherein the steps further comprise:
generating a plurality of found sequences based on a search result list provided by a query-expansion search for, in part, a search term based on a provided semantic, wherein the query semantic sequence and the candidate semantic sequence are comprised in the plurality of found sequences;
if the matching score is above a threshold, determining a resulting semantic from the candidate sequence wherein the resulting semantic is associated with a slot-hint; and
including the resulting semantic in a semantically matched knowledge structure within the ontology.

4. The system of claim 1, wherein the query semantic sequence and the candidate semantic sequence comprises a plurality of semantics, wherein at least one of the plurality of semantics comprises at least one of a grammatical type of a word, at least one ontological class of the word, a morphological stem of the word, or a slot-hint of the word, wherein the ontological class of the words matched is based on a least common subsumer of the words matched.

5. The system of claim 1, wherein the similarity score is based on a function of at least a distance in ontological space between a semantic comprised in the subsequence and another semantic comprised in the other subsequence, a size of an intersection between attributes of the semantic and other attributes of the other semantic, or a morphological similarity between a word associated with the semantic and another word associated with the other semantic.

6. The system of claim 1, wherein the refining comprises a neural network training of words or items in the ontology to create affinities between the words or items for measuring similarities in a vector space.

7. The system of claim 1, wherein the matching score is based on a function of a plurality of similarity scores for matched subsequences.

8. The system of claim 1, wherein the matched sequence comprises a matched subsequence that is matched against a query subsequence comprised in the query semantic, and wherein the matched subsequence is matched against a candidate subsequence comprised in the candidate semantic sequence.

9. The system of claim 1, wherein the steps further comprise:
generating the query semantic sequence based at least in part on a sequence of semantic heads of sub-trees from a level of a natural language parse tree of a query sentence.

10. The system of claim 1, wherein the steps further comprise:
generating the query semantic sequence based at least in part a portion of leaves of a natural language parse tree of a sentence.

11. A device for retrieving a semantically matched knowledge structure, comprising:
an input component for receiving an input;
a memory component for storing a dense semantic vector indication of concepts;
a processor connected to the input component and the memory component, wherein the processor performs steps comprising:
constraint-matching a query semantic sequence received through the input component with a candidate semantic sequence stored on the memory component based on maximizing a plurality of constraints;
finding the candidate semantic sequence for constraint-matching with the query semantic sequence, wherein the finding is based at least in part on a semantic comprised in the query semantic sequence; and
providing a resulting semantic sequence chosen between the matched sequence and another matched sequence based at least in part on a comparison of the associated matching score and another associated matching score of the other matched sequence.

12. The device of claim 11, wherein the query semantic sequence and the candidate semantic sequence comprises a plurality of semantics, wherein at least one of the plurality of semantics comprises at least one of a grammatical type of a word, at least one ontological class of the word, a morphological stem of the word, or a slot-hint of the word, wherein the ontological class of the words matched is the least common subsumer of the words matched.

13. The device of claim 11, wherein the steps further comprise:
determining a slot-hint for a semantic in the query semantic sequence based at least in part on a named-entity-recognition function.

14. The device of claim 11, wherein the steps further comprise:
providing the query semantic sequence based at least in part on a sequence of semantic nodes in a natural language parse tree of a query sentence; and
determining an answer slot-hint for the query sentence; and retrieving an answer semantic from the matched sequence based at least in part on a comparison of a slot-hint of the answer semantic and the answer slot-hint.

15. The device of claim 11, wherein the steps further comprise:
selecting the candidate sequence from a search result list provided by a query-expansion search for, in part, a search term based on the semantic.

16. The device of claim 11, wherein constraint-matching the query semantic sequence with the candidate semantic sequence comprises at least a common subsequence match, a Rabin-Karp pattern match, a Knuth-Morris-Pratt pattern match, Boyer-Moore pattern match, or a Diff pattern match.

17. The device of claim 11, wherein the steps further comprise:
disambiguating an ontological class set of a semantic of the matched sequence based at least in part on a word-sense-disambiguation function.

18. The device of claim 11, wherein the steps further comprise:
generating the candidate semantic sequence based at least in part on a sequence of nodes of a natural language parse of a candidate sentence; and generating the query semantic sequence based at least in part on a sequence of nodes of a natural language parse of a candidate of query sentence.

19. The device of claim 11, wherein the steps further comprise:
before constraint-matching the query semantic sequence with the candidate semantic, determining a slot-hint for a semantic in the candidate semantic sequence or the query semantic sequence based at least in part on a named-entity-recognition function.

20. A method for retrieving a semantically matched knowledge structure, comprising:
receiving a question and answer pair, wherein the question and answer pair includes a question and an answer, and wherein the answer is received from a query of a search engine;
constraint-matching the question with the answer based on maximizing a plurality of constraints, wherein at least one of the plurality of the constraints is a similarity score between the question and the answer, wherein the constraint matching generates a matched sequence;
finding, for the matched sequence, a subsequence that is not parsed as an answer slot;
sending to an information retrieval engine the subsequence that is not parsed as the answer slot;
providing a frame of other answers from results of the information retrieval engine; and
generalizing an ontology based on the frame.

* * * * *